(12) United States Patent
Robison

(10) Patent No.: US 7,120,904 B1
(45) Date of Patent: Oct. 10, 2006

(54) DATA-FLOW METHOD FOR OPTIMIZING EXCEPTION-HANDLING INSTRUCTIONS IN PROGRAMS

(75) Inventor: Arch D. Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/552,292

(22) Filed: Apr. 19, 2000

(51) Int. Cl.
*G06F 9/45* (2006.01)

(52) U.S. Cl. .................. 717/155; 717/159

(58) Field of Classification Search ............ 717/127, 717/131, 144, 151, 154, 159, 155, 156; 712/244
See application file for complete search history.

(56) References Cited

U.S. PATENT DOCUMENTS

| | | | | |
|---|---|---|---|---|
| 5,067,073 A | * | 11/1991 | Andrews | 714/38 |
| 5,421,022 A | * | 5/1995 | McKeen et al. | 712/23 |
| 5,628,016 A | * | 5/1997 | Kukol | 717/140 |
| 6,018,799 A | * | 1/2000 | Wallace et al. | 712/300 |
| 6,093,216 A | * | 7/2000 | Adl-Tabatabai et al. | 717/128 |
| 6,128,775 A | * | 10/2000 | Chow et al. | 717/156 |
| 6,151,706 A | * | 11/2000 | Lo et al. | 717/155 |
| 6,247,172 B1 | * | 6/2001 | Dunn et al. | 717/141 |
| 6,301,704 B1 | * | 10/2001 | Chow et al. | 717/146 |
| 6,324,683 B1 | * | 11/2001 | Fuh et al. | 717/124 |
| 6,415,433 B1 | * | 7/2002 | Callahan et al. | 717/160 |
| 6,446,258 B1 | * | 9/2002 | McKinsey et al. | 717/161 |
| 6,487,716 B1 | * | 11/2002 | Choi et al. | 717/159 |
| 6,507,805 B1 | * | 1/2003 | Gordon et al. | 702/186 |

OTHER PUBLICATIONS

"How Debuggers Work", by Jonathan B. Rosenberg, 1996, pp. 136-139.*
Jens Knoop, et al., "Optimal Code Motion: Theory & Practice," ACM Transactions on Programming Languages and Systems, vol. 16, No. 4, Jul. 1994, pp. 1117-1155.*
Jens Knoop et al.; "Optimal Code Motion: Theory and Practice", ACM Transactions on Programming Languages and Systems, vol. 16, No. 4, Jul. 1994.

* cited by examiner

*Primary Examiner*—Tuan Dam
*Assistant Examiner*—Eric B. Kiss
(74) *Attorney, Agent, or Firm*—Blakely, Sokoloff, Taylor & Zafman LLP

(57) ABSTRACT

A method for analyzing and optimizing programs that operate on a data structure where the state of the data structure must be valid at certain program points. The program is represented as a control-flow graph. The method decomposes the state of the data structure into components, and applies partial redundancy elimination to place instructions that set the state of the data structure, with a variation that permits speculative placement. Application extends to manipulating a stack that keeps track of what to do should an exception arise during execution. In this context, a control-flow representation of contingencies is converted into placement of instructions that manipulate the stack.

12 Claims, 25 Drawing Sheets

**Microfiche Appendix Included
(2 Microfiche, 153 Pages)**

FIG. 1

```
struct S {                    /-100
    S() throw();  ~101
    ~S() throw(); ~102
};
struct T {                    /-103
    T(); ~104
    ~T(); ~105
};

void woof();
...                 ~106
L1: {
    T ant; ~107
108~try {         /-109
        if( x>0 ) {
            S boa; ~110
111~} else {
            S cat; ~112
            T dog; ~113
            woof(); ~114
115~}
116~} catch( int y ) { ~117
        S elk; ~118
        woof(); ~119
120~}
} ~121
L2:;
```

```
#include <setjmp.h>
                        ┌─200
struct EH_item {        ┌─201
    struct EH_item * next;
    enum {DESTROY,TRY} tag; ─202
    union {
        struct {
            void * object; ─203
            void (*dtor)();
        } destructor;      ─204
        struct {
            jmp_buf buffer; ─205
            struct handler_spec* handlers;
        } try_block;                       ─206
    };
};

struct EH_item * EH_stack_ptr; ─207
```

```
        struct EH_item ra, rb, rc, rd, re, rt;
        L1:
303 —   T(&ant);
304 —   ra.kind = DESTROY;
        ra.destructor.object = &ant; ra.destructor.dtor = &~T;
306 —   ra.next = EH_stack_ptr; EH_stack_ptr = &ra;
307 —   rt.kind = TRY;
        rt.next = EH_stack_ptr;
        rt.try_block.handlers = ...;
31  —   rt.next = EH_stack_ptr; EH_stack_ptr = &rt;
31  —   if( setjmp( rt.try_block.buffer)==0 ) {
            if( x>0 ) {
313 —       S(&boa);
314 —       rb.kind = DESTROY;
                rb.destructor.object = &boa; rb.destructor.dtor = &~S;
                rb.next = EH_stack_ptr; EH_stack_ptr = &rb;
31  —       EH_stack_ptr = EH_stack_ptr->next;
                ~S(& boa);
            } else {
                S(cat);
                rc.kind = DESTROY;
                rc.destructor.object = &cat; rc.destructor.dtor = &~S;
                rc.next = EH_stack_ptr; EH_stack_ptr = &rc;
                T(&dog);
                rd.kind = DESTROY;
                rd.destructor.object = &dog; rd.destructor.dtor = & ~T;
                rd.next = EH_stack_ptr; EH_stack_ptr = &rd;
                woof();
                EH_stack_ptr = EH_stack_ptr->next;
                ~T(&dog);
                EH_stack_ptr = EH_stack_ptr->next;
                ~S(& cat);
            }
        } else {
            S(&elk);
            re.kind = DESTROY;
            re.destructor.object = &elk; re.destructor.dtor = address of ~S();
            re.next = EH_stack_ptr; EH_stack_ptr = &re;
            ~S(&elk);
            EH_stack_ptr = EH_stack_ptr->next;
        }
342 —   EH_stack_ptr = EH_stack_ptr->next;
343 —   EH_stack_ptr = EH_stack_ptr->next;
34  —   ~T(ant);
        L2:
```

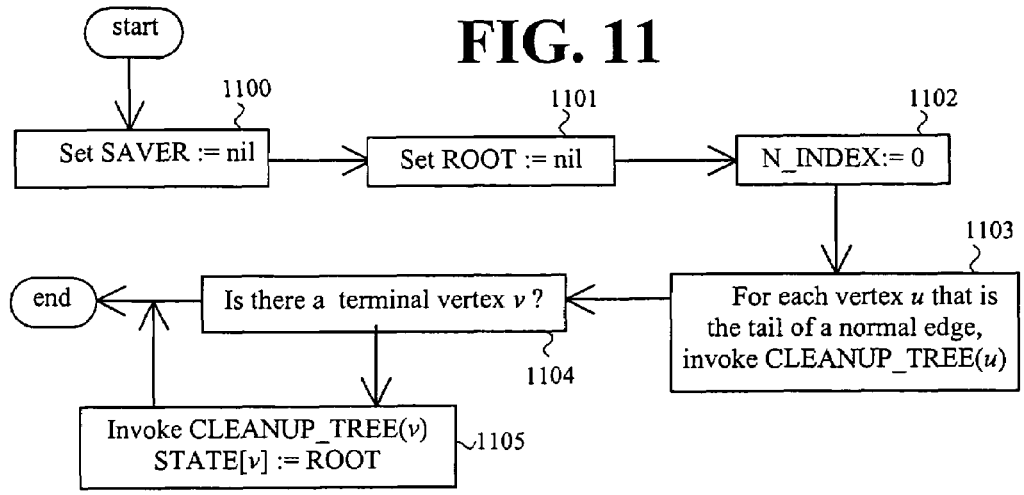
FIG. 11
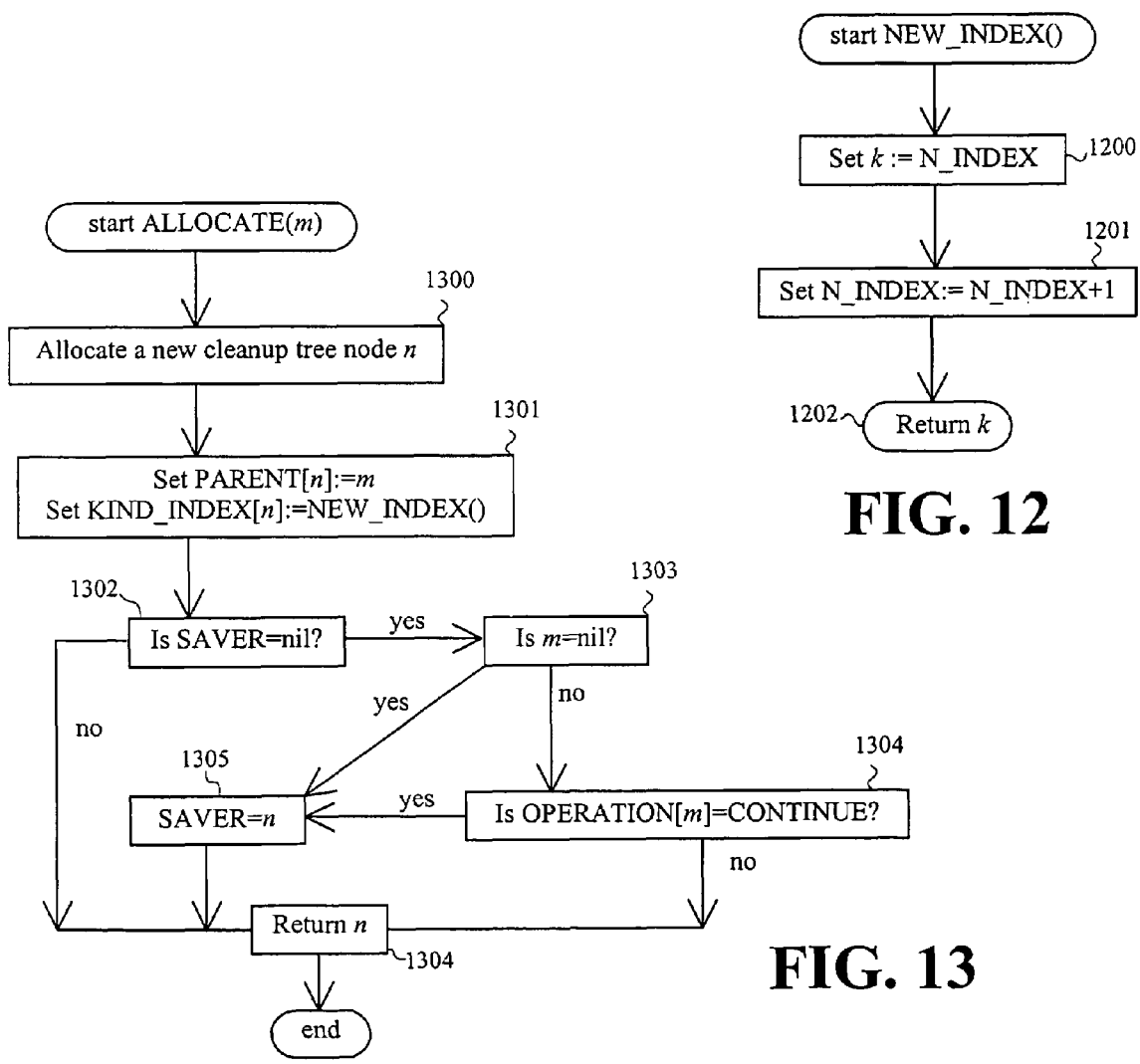
FIG. 12
FIG. 13

FIG. 23
```
struct EH_item ra, rb, rc, rd, re, rt;  ~2301
L1:
ra.next = EH_stack_ptr;  ~2303
T(&ant);
if( x>0 ) {
    S(&boa);
    ~S(&boa);
} else {
   ra.kind = DESTROY;
   ra.destructor.dtor = &~T;
   ra.destructor.object = &ant;
   rt.kind = TRY;
   rt.next = &ra;
   rt.try_block.handlers = ...;
   rt.next = &ra;
   rc.kind = DESTROY;
   rc.destructor.dtor = &~S;
   rc.next = &rt;
   rd.kind = DESTROY;
   rd.destructor.dtor = &~T;
   rd.next = &rc;
   eh_stack_ptr = &rc;
   if( setjmp( &rt.try_block.buffer)==0 ) {
       S(&cat);
       rc.destructor.object = &cat;
       T(&dog)
       rd.destructor.object = &dog;
       eh_stack_ptr = &rd;
       woof();
       EH_stack_ptr = &rc;
       ~T(&dog);
       EH_stack_ptr = ra.next;
       ~S(&cat);
   } else {
   re.kind = DESTROY;
       re.next = &ra;
       re.destructor.dtor = &~S;
       eh_stack_ptr = &re;
       S(&elk);
       re.destructor.object = &elk;
       woof();
       EH_stack_ptr = ra.next
       ~S(&elk);
   }
}
~T&ant)
L2:
```

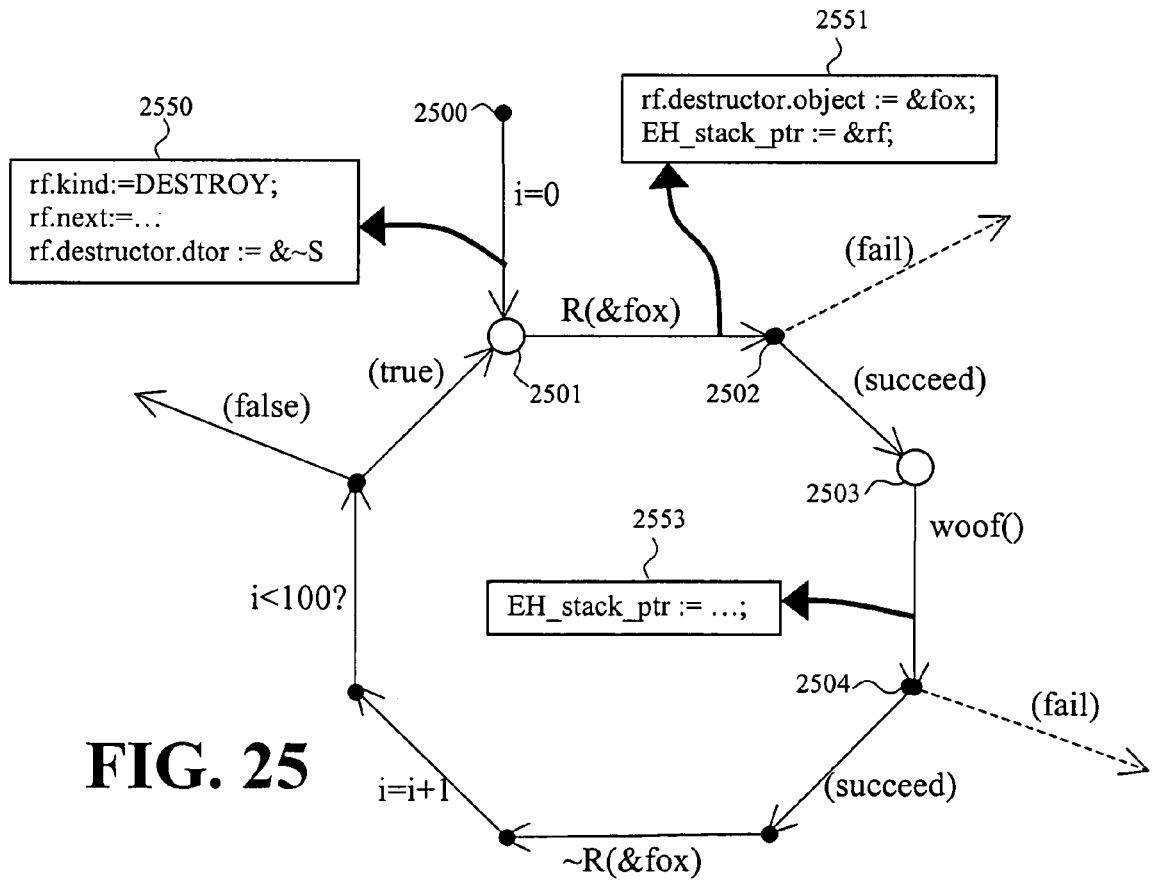

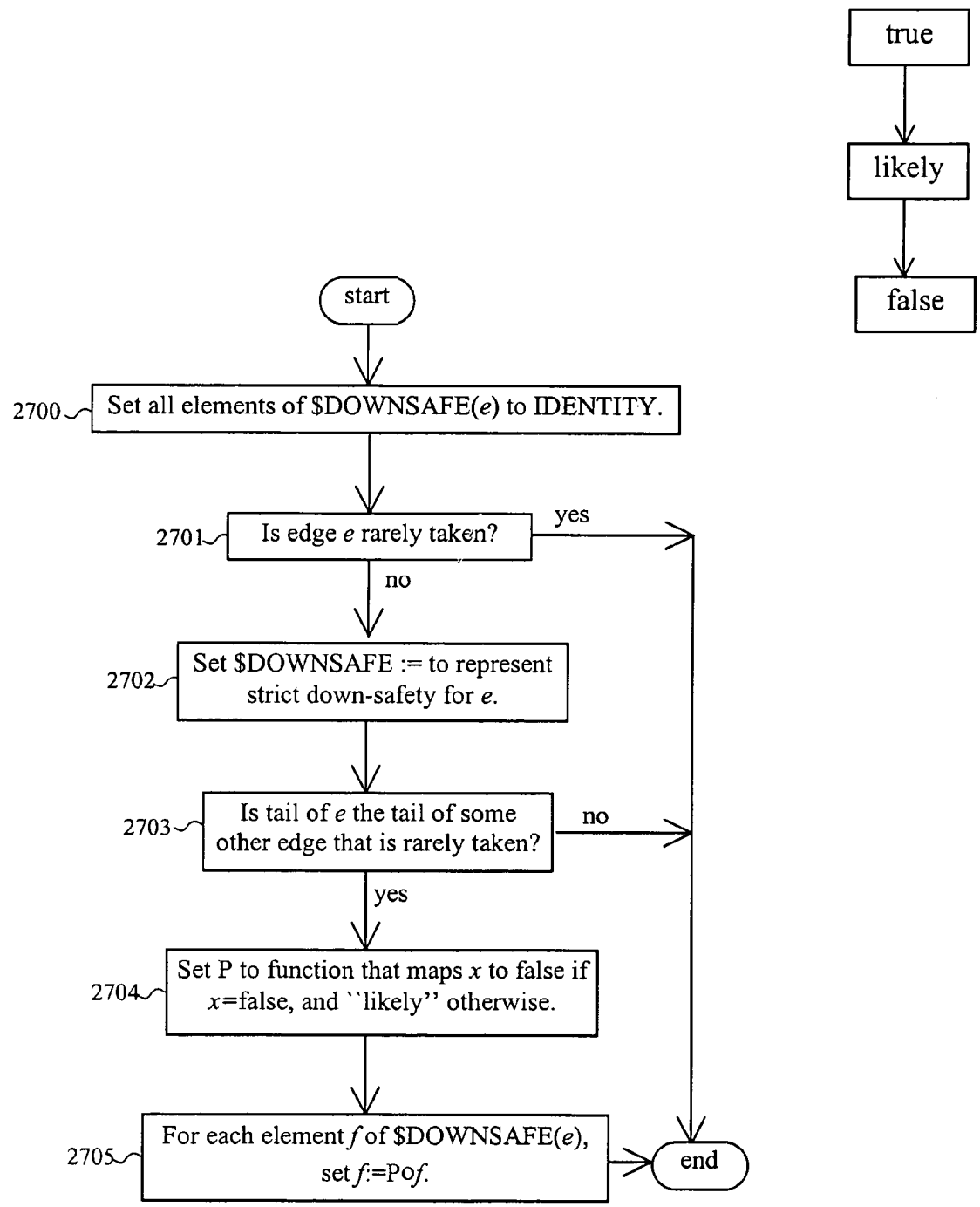

DATA-FLOW METHOD FOR OPTIMIZING EXCEPTION-HANDLING INSTRUCTIONS IN PROGRAMS

MICROFICHE/COPYRIGHT REFERENCE

A Microfiche Appendix is included in this application (2 sheets, 153 total frames) that contains material which is subject to copyright protection. The copyright owner has no objection to the facsimile reproduction by anyone of the Microfiche Appendix, as it appears in the Patent and Trademark Office patent files or records, but otherwise reserves all copyright rights whatsoever.

FIELD OF THE INVENTION

The present invention generally relates to software compiler technology. More particularly, the present invention relates to a method for placing exception-handling instructions in a program.

BACKGROUND OF THE INVENTION

With the field of compilers, the problem of handling exceptions is important for languages that permit them. For example, the C++ and JAVA programming language permit a program to "throw an exception", which means that a structure (the exception) is constructed, and then transmitted (thrown) up the execution stack until a handler catches the exception, at which point normal execution continues. A key feature of both C++ and JAVA programming language is that they permit the programmer to specify cleanup actions to be performed if an exception is thrown. In C++, these actions are destructions of objects that are popped from the execution stack by the throwing of the exception. In JAVA programming language, these actions are code specified by "finally" clauses.

There are a variety of ways of keeping track of cleanup actions. One way is to construct lookup tables that are consulted when an exception is thrown. The tables map program-counter values onto cleanup actions, so that when an exception is thrown, the exception-handling mechanism can, knowing the current program-counter value, determine the necessary cleanup actions. The disadvantage of this prior-art technique is that the tables require expressing program-counter values and offsets within the execution stack, a notion not directly expressible in the C language, and thus is not amenable to implementation in compilers that generate intermediate code in the C language.

Another approach is, during normal execution, to register each cleanup action by pushing it onto a "exception-handling (EH) stack" when it might be needed to handle an exception, and popping it from said stack when it is no longer needed. This prior-art approach has the advantage that it is amenable to compilers that generate intermediate code in the C language. However, prior-art implementations have the disadvantage of being quite inefficient, because of excessive pushing and popping of the EH stack.

FIG. 1 shows an example program in the C++ language. It declares types S and T. Declaration 100 declares type S to have constructor 101 and destructor 102, both of which have throw( ) clauses that specify that they cannot throw exceptions. Declaration 103 declares type T to have constructor 104 and destructor 105, both of which can throw an exception since neither contains a throw( ) clause. Declaration 106 declares routine "woof", which may throw an exception if called. Declaration 107 constructs an object "ant". A try block (between braces 108 and 116) surrounds the if-statement with test 109. If x>0, then declaration 110 constructs object "boa". There is an implicit call to the destructor ~S for boa at brace 111, because the scope in which "boa" was declared is exited. If x≦0, then declarations 112 and 113 construct objects "cat" and "dog" respectively, followed by call 114 to "woof". At brace 115, objects "dog" and "cat" are destroyed by implicit calls to their destructors, because their scope is being exited. Destructions are always in reverse order of construction. If an exception is thrown while execution is inside the try block, then any objects constructed inside the try block (i.e. between brace 108 and brace 116) are destroyed, and then the catch handler is inspected to see if it matches the type of exception thrown, which in this case is thrown objects of type int. If the handler matches, the block between braces 117 and 119 is executed. Declaration 118 constructs object "elk". There is an implicit call to the destructor ~S at brace 120 to destroy "elk" if the handler is exited by normal execution or because call 119 to "woof" throws an exception. Object "ant" is destroyed when the outer block (ending at brace 121) is exited, no matter whether the exit is by normal execution or because an uncaught exception was thrown.

Actions taken between the time an exception is thrown and a matching try block is found are called "cleanup".

FIG. 2 shows the basic declarations for an example EH stack. The stack consists of zero or more instances of structure 200 EH_item, each of which is part of a linked list linked by field 201 "next" that points to the next EH_item deeper in the stack. The top of the stack is represented by global variable 207 EH_stack_ptr, which points to the root of the linked list. Tag 202 indicates the kind of item. There are two kinds of items in the example: items that specify destructions of objects, and items that specify try blocks.

For the destruction of an item, the tag is DESTROY. Field 203 "object" points to the object to be destroyed, and field 204 "dtor" points to the code to invoke for that item. For other sorts of cleanup, say the JAVA programming language "finally" clause, or C++"exception specifications", the field "dtor" points to the code to be executed, and the "object" field is not used, or points to some sort of data structure that further specifies the cleanup to be done. (The exact nature of the cleanup is beyond the scope of this disclosure, and therefore the cleanups in the example are restricted to simple destructions.)

For try blocks, the tag is TRY, and field 205 "buffer" contains information required to resume normal execution if the handler catches an exception. The field 206 handlers point to information about the type of exceptions caught, and their respective handlers. (The exact nature of the handlers is also beyond the scope of this disclosure. Those skilled in the art will appreciate that for a try block, there is information related to how to resume normal execution, and information related to determining the type of exception caught.)

FIG. 3 shows a translation of FIG. 1 using the prior art. Calls to constructors and destructors are explicit in the translation. Lines 303 and 344 respectively call the constructor and destructor for object "ant". Each time an object is constructed, an EH_item for the object is pushed onto the EH stack by adding it to the front of the linked list rooted at EH_stack_ptr. Items "ra", "rb", "rc", "rd", "re", and "rt" correspond to objects ant, boa, cat, dog, elk, and the try block respectively. The requisite fields of each EH_item are set immediately after the corresponding object is constructed. For example, line 313 constructs object "boa", and lines 313–317 set "rb" and push it on the EH stack. When execution is about to exit a block, before each object to be destroyed is destroyed, the corresponding item on the EH stack is popped by removing it from the linked list. For example, line 317 pops "rb" from the EH stack.

The code in FIG. 3 is inefficient because it fills fields prematurely. For example, call 311 to "setjmp" fills in information that is used only if an exception is thrown, but if x>0, then only object "boa" is constructed, and both the constructor and destructor for boa were declared as never throwing an exception. Similarly, despite the fact that the constructor and destructor for "ant" can both throw exceptions, if x>0, there is nothing between the call to the constructor and destructor for "ant" that might require the exceptional destruction of ant. Thus, setting EH_item "ra" and pushing it on the EH stack (lines 304–306) for sake of "ant", and setting EH_item "rt" and pushing it on the EH_stack (lines 307–310) for sake of the try block are unnecessary when x>0. Likewise, EH item "rb" is in fact useless, and lines 314–317 contribute nothing but inefficiency. Furthermore, lines 342–343 pop two EH_items from the EH stack less than perfectly: the same effect could have been achieved more quickly via "EH_stack_ptr=ra.next".

A common method of removing inefficiencies is partial redundancy elimination. Unfortunately, prior-art methods of partial redundancy analysis do not handle redundancies as complicated as adding or removing items from a linked list. What is needed is an approach that circumvents the problem by analyzing programs in a way that generates a problem more amenable to partial redundancy elimination.

BRIEF SUMMARY OF THE INVENTION

Accordingly, the present invention provides a method and apparatus that analyzes the required state of a data structure. At selected program points, the invention first determines at what the state of the data structure should be. The state is partitioned into components, each of which may be set separately. The operations required to set the components are determined, and the operations placed in a way that eliminates partial redundancies.

When the state is a stack, the present invention represents each state as a path on a tree of nodes, where the path is directed towards the root of the tree. When the stack is an EH stack, the present invention provides a method of identifying the program points where the EH stack state must be valid, and what the EH stack state must be at those points. Actions taken when an exception occurs are represented by explicit paths in a control-flow graph. Flow equations for the down-safety of setting the state of items on the EH stack are constructed and solved, on a speculative assumption that exceptions rarely occur. Flow equations for the up-safety of setting the state of items on the EH stack are constructed and solved, with compensation for speculative assumptions made in the computation of down-safety. The solutions of both sets of flow equations are used to determine where to place operations that set the state of an item on the EH stack. Edges in the control-flow graph that represent actions taken for sake of an exception are removed, and finally a prologue is inserted at the entry to the transformed graph.

These and other features and advantages of the invention will become apparent upon a review of the following detailed description of the presently preferred embodiments of the invention, viewed in conjunction with the appended drawings.

BRIEF DESCRIPTION OF SEVERAL VIEWS OF THE DRAWINGS

FIG. 1 shows an example program in the programming language C++.

FIG. 2 shows structures concerning exceptions employed when a program is executed.

FIG. 3 shows a translation of FIG. 1 typical of the prior art.

FIG. 11 is a flow chart for a method of building a forest of cleanup trees.

FIG. 12 is a flow chart of method NEW_INDEX( ), which allocates a new index for a flow equation.

FIG. 13 is a flow chart for method ALLOCATE(m), which allocates a new cleanup tree node with parent m.

FIG. 23 shows the results of transforming FIG. 1 via a method in accordance with the present invention.

FIG. 24 shows an example program that benefits from speculative placement of exception-handling instructions.

FIG. 25 shows a control-flow graph corresponding to the program of FIG. 24, along with exception-handling instructions inserted by a method in accordance with the present invention.

FIG. 26 shows a lattice for implementing flow equations that distinguish speculative down-safety from strict down-safety.

FIG. 27 shows a method for computing vector $DOWNSAFE(e).

DETAILED DESCRIPTION OF PRESENTLY PREFERRED EMBODIMENTS OF THE INVENTION

The present invention can work with a variety of representations of exception-handling constructs.

Here is a summary of notations. The symbols "∧" and "∨" denote logical AND and OR respectively. When ≦ is used to compare Boolean values, "false" is considered less than "true". Except in listings for the C or C++ languages, the symbol "=" has its usual mathematical meaning of denoting equality, and ":=" denotes assignment. Thus "a=(b=c)" means to compare b and c, and compare the resulting Boolean value (true or false) with the Boolean value a. In contrast, "a:=(b=c)" means to compare b and c, and assign the resulting Boolean value to a. For the listings using the C or C++ languages, the symbol "=" has the usual C and C++ meaning of denoting assignment, and the symbol "==" denotes comparison for equality.

Figure 4:
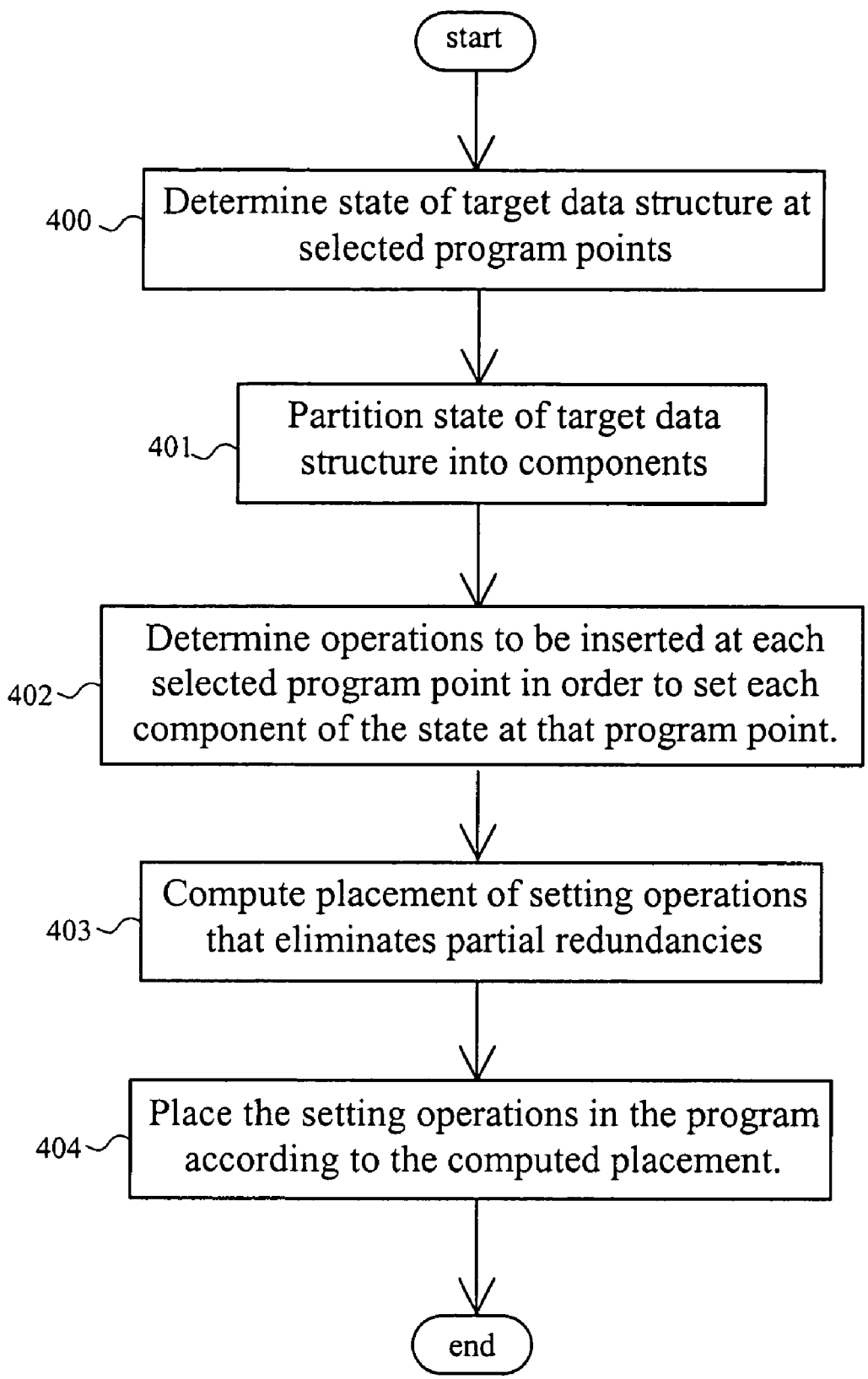
FIG. 4 shows a flow chart of the overall operation of a method in accordance with the present invention.

FIG. 4 shows an overview of the steps of a method in accordance with the present invention. The steps permits a much more general optimization than just for exception handling, and thus are stated in a general form. The general problem is that given a set of selected program points, insert operations into the program that guarantee that the data structure will be in the correct state at the selected points (but perhaps in an incomplete or incorrect state at other points). The selection of program points depends upon the application of the invention. For example, when applying it to optimizing the EH stack, the selected points are those just before an instruction that might throw an exception. Step 400 determines the state of the data structure at the selected program points. There are a multitude of ways to do this determination, including dataflow analysis and abstract interpretation. For the exception-handling example, the data structure is the EH stack. Step 401 partitions the state of the data structure into components. In our example, the components are the EH_stack_ptr and the fields of the EH_item. Step 402 determines operations to be inserted at each selected program point in order to set each component of the state at said program point. In our example, these operations are the assignments and call to setjmp required to set EH_stack_ptr and the fields of each EH. The goal of steps 400–402 is to convert a problem that might be difficult or impossible for partial-redundancy elimination into a problem that it can handle easily. Steps 403 and 404 perform the analysis and transformation respectively that eliminate partial redundancies.

Figure 5:
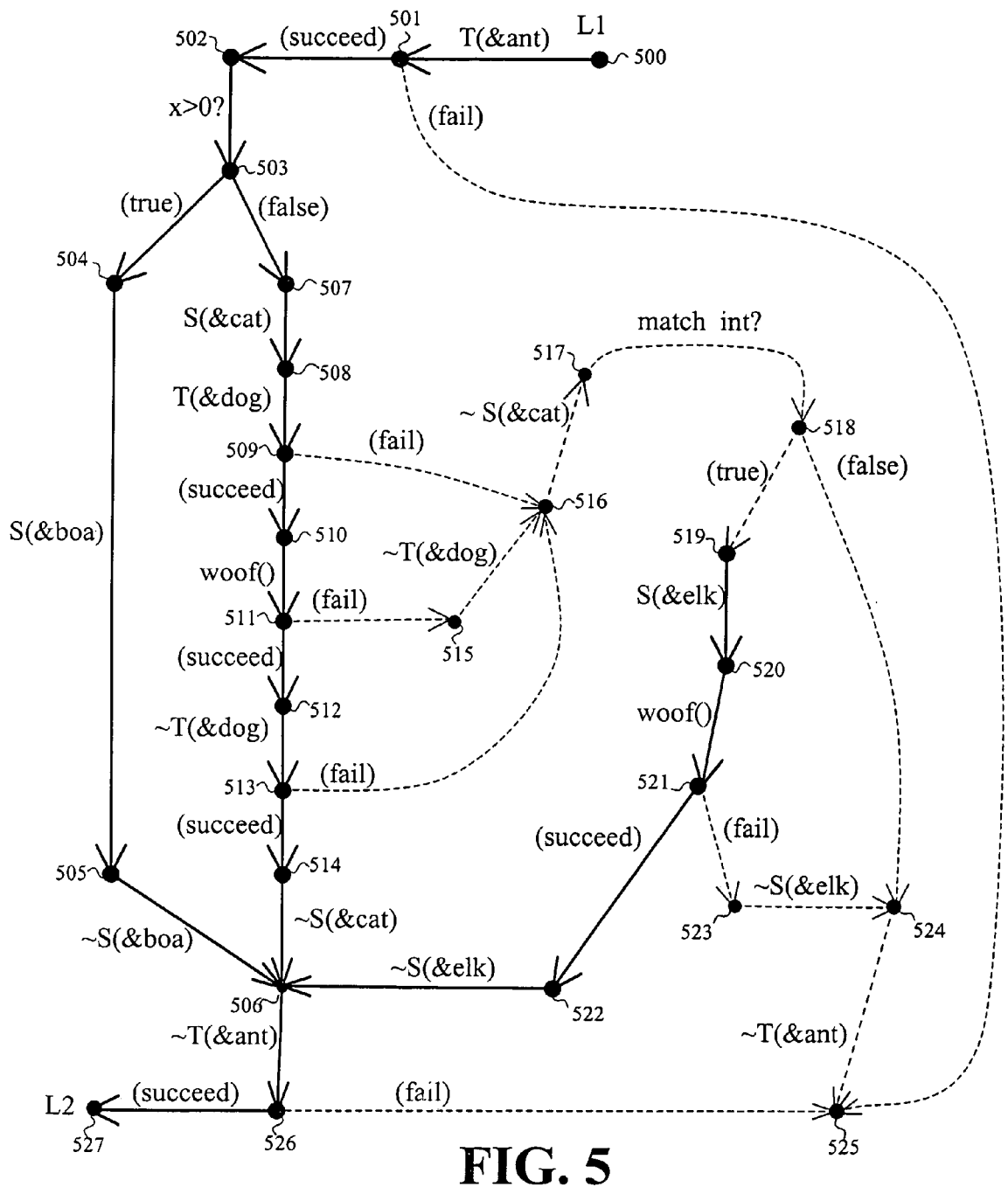
FIG. 5 shows a control-flow graph corresponding to the program in FIG. 1.

FIG. 5 shows a control-flow graph representation of the program in FIG. 1. The graph is an edge-labeled graph, meaning that instructions are attached to edges, rather than vertices. An edge-labeled graph simplifies implementation and explanation of the present invention, but is not required. The present invention works equally well with other forms, such as the traditional vertex-labeled control-flow graph. Each edge, before transformation, has either a single instruction or a label indicating a branch decision. After transformation, there may be multiple instructions on an edge. Edges labeled "(true)" or "(false)" are taken if the preceding instruction evaluates to true or false respectively. Edges labeled "(fail)" are taken if the preceding instruction throws an exception. Edges labeled "(succeed)" are taken if the preceding instruction does not throw an exception. Edges denoted by dashed lines denote "exceptional" execution: these are edges that ultimately will be removed by methods in accordance with the present invention. Edges that are not "exceptional" are called "normal".

There are three special vertices, called "initial", "terminal", and "throw". The initial vertex 500 represents entry into the graph. The terminal vertex 527 represents leaving the graph by normal execution. The throw vertex 525 represents leaving the graph because an exception was thrown and not caught. A control-flow graph will always have an "initial vertex". However, a control-flow graph may be missing a "terminal" vertex if it never returns via normal execution, or may be missing a "throw" vertex if it never throws an exception (or if every exception thrown is caught within the routine).

The details of FIG. 5 are explained here. For brevity, the notation "edge u–v" means the edge with tail vertex u and head vertex v. Edge 500–501 constructs object "ant". If the constructor throws an exception, control goes to vertex 525. Control goes there, and not to vertex 524, because C++ semantics consider an object not constructed until its constructor completes without throwing an exception. If "ant" is successfully constructed, control goes to vertex 502. Edge 502–503 evaluates the test x>0. If true, then control passes to edge 504–505, which constructs object "boa", and then edge 505–506 destroys object "boa". Since the constructor and destructor for "boa" were declared as not throwing exceptions, there are no "(fail)" or "(succeed)" edges leading from vertices 505 or 506. If the test x>0 evaluates to false, then control passes to edge 507–508, which constructs object "cat", and then to edge 508–509, which constructs object "dog". Since the construction of "dog" may throw an exception, there are "(succeed)" and "(fail)" edges leading from vertex 509. If no exception is thrown, then edge 510–511 calls routine "woof", and if the latter does not throw an exception, edge 512–513 calls the destructor for "dog", and edge 513–514 calls the destructor for "cat". Otherwise, if the constructor or destructor for "dog" throws an exception, control passes to vertex 516. Similarly, if the call to "woof" on edge 510–511 throws an exception control passes to edge 515–516, which destroys "dog". Edge 516–517 destroys "cat". Vertex 517 represents entry into the try-catch mechanism. Edge 517–518 represents the test of whether the catch clause catches the exception thrown. If the exception's type matches type int, the test evaluates to true, and control goes to vertex 519, which represents entry into the catch clause. Edge 519–520 constructs "elk". Edge 520–521 calls routine "woof", and if it throws an exception, control passes to edge 523–524, which calls the destructor for "elk". If the catch clause was not taken after vertex 518, or the call to "woof" on edge 520–521 throws an exception, then control reaches edge 524–525, which calls the destructor for "ant". Exception processing continues after control implicitly leaves "throw vertex" 525. If the call on edge 520–521 does not throw an exception, then edge 522–506 calls the destructor for "elk". Unless an uncaught exception is thrown somewhere within the graph, control eventually reaches edge 506–526, which calls the destructor for "ant". If the destructor does not throw an exception, control reaches the "terminal vertex" 527 and implicitly leaves the graph. If the destructor throws an exception, then edge 526–525 routes control to the aforementioned "throw vertex". The graph shown assumes that destructions that occur on exceptional edges do not throw exceptions. This assumption is guaranteed by C++ semantics. If the language semantics do allow such exceptions, it is a simple matter to extend the control-flow graph to represent the possible executions.

Each edge is classified as either "normal" or "exceptional". An exceptional edge is any edge representing execution between when an exception is thrown and it is caught. A normal edge represents any other execution. An exceptional path is any contiguous path of exceptional edges. In FIG. 5 exceptional edges are dashed. An instruction on an exceptional edge that destroys an object is called a cleanup instruction.

The control-flow graphs for the preferred embodiment should have the following property: no vertex is both the head of a plurality of edges and the tail of a plurality of edges. If a vertex violates this property, it is straightforward to expand the vertex into an edge u→v, and make u and v the head and tail of the edges that were incident to the offending vertex.

Figure 6:
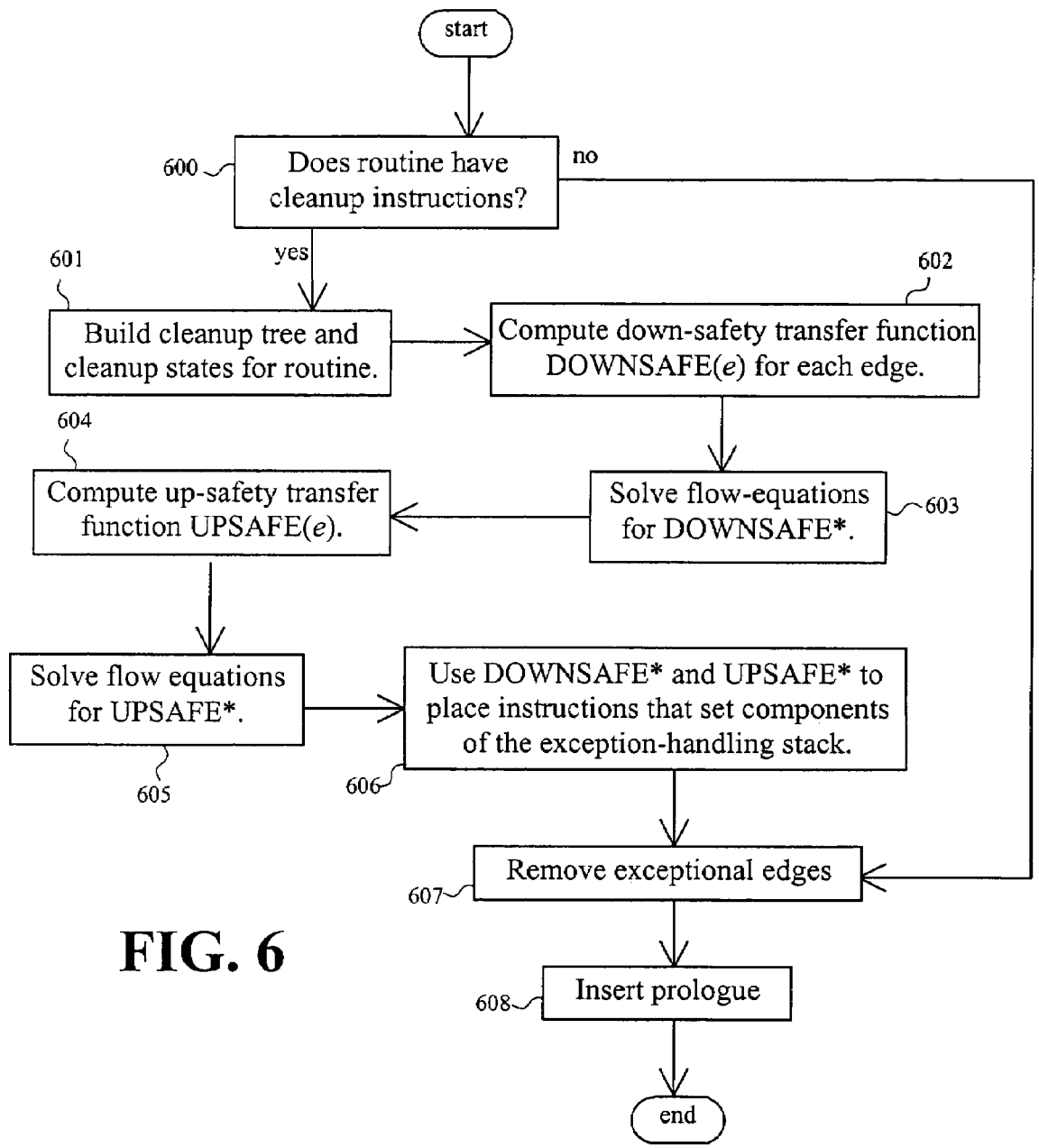
FIG. 6 shows a flow chart of the operation of a method for optimizing exception-handling instructions in accordance with the present invention.

FIG. 6 refines the notions of FIG. 4 for the problem of exception handling in a given routine. Step 600 checks whether the routine has cleanup instructions. If there are no such instructions, then steps 601–606 are skipped, since they concern analysis and transformation of cleanup instructions. Otherwise step 601 builds a cleanup tree and cleanup states, which represents (and implicitly partitions) the state of the EH stack at program points where an exception might be thrown. The cleanup tree and states also implicitly determines the operations to be inserted. Steps 602 through 605 perform partial redundancy analysis. Steps 602–603 compute down-safety for the operations, and steps 604–605 compute up-safety for the operations. Down-safety should be computed first because its results can be used to improve the results of the up-safety computation. Step 606 uses the solutions for down-safety and up-safety to place instructions that set components of the EH stack. Step 607 simply removes edges from exceptional paths, as their purpose has been replaced by the instructions inserted by step 606. Step 608 inserts a prologue at the beginning of the routine. The prologue consists of zero or more instructions that perform some housekeeping.

Figure 7:
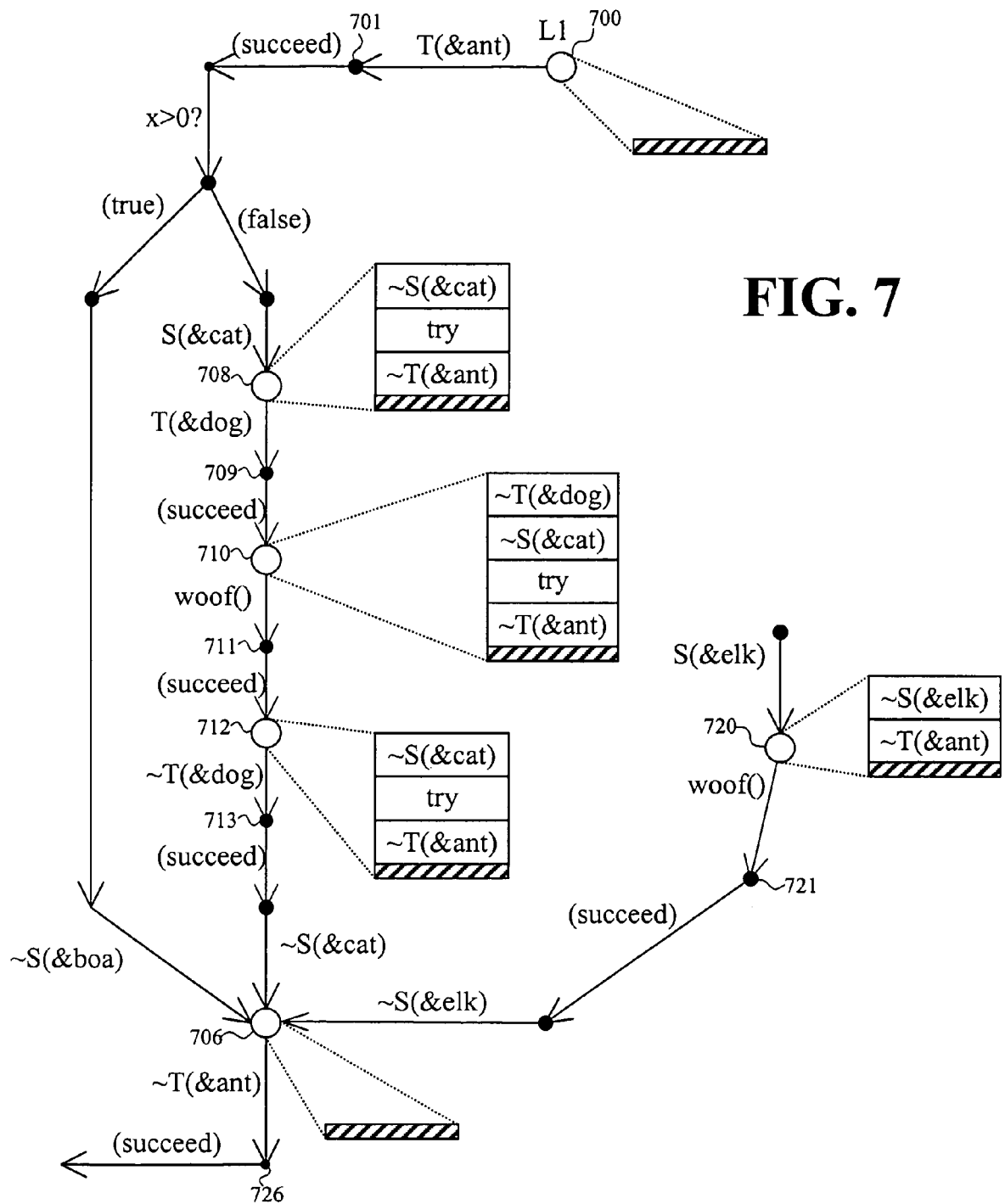
FIG. 7 shows the EH stack states required for some vertices of a control-flow graph.

FIG. 7 shows the required EH stack states for the example in FIG. 1. For convenience, the reference numerals for vertices in FIG. 7 are exactly 200 more than those for the corresponding vertices in FIG. 5. Only normal edges are shown; exceptional edges have been removed. Valid EH stack states are required for each vertex that is the tail of an edge which has an operation that might throw an exception, because if an exception is thrown, further processing depends upon the EH stack. Those vertices are illustrated as small open circles. At all other vertices, the EH stack state is irrelevant, and does not have to be valid. The stack states shown are for cleaning up object declared in the program fragment of FIG. 1. The stack implicitly continues further down for objects outside the scope of said fragment; this implicit portion is called the "continuation stack". Thus the EH stack states for vertices 700 and 706 are simply the continuation stack, and must be valid at those vertices because respectively edges 700–701 and 706–726 might throw an exception. The EH stack state for vertices 708 and 712 specifies that (if an exception is thrown by edges 708–709 and 712–713 respectively), object "cat" should be destroyed, the catch clauses for the try block inspected, and, if the exception is not caught, then object "ant" should be destroyed, followed by whatever the continuation stack specifies. The EH stack state for vertex 710 adds the destruction of object "dog" on top of the state for vertices 708 and 712, and is required because the call to "woof" on edge 710–711 might throw an exception. The EH stack state for vertex 720 specifies that if the call to woof( ) on edge 720–721 throws an exception, both objects "elk" and "ant" should be destroyed (followed by whatever the continuation stack specifies).

Figure 8:
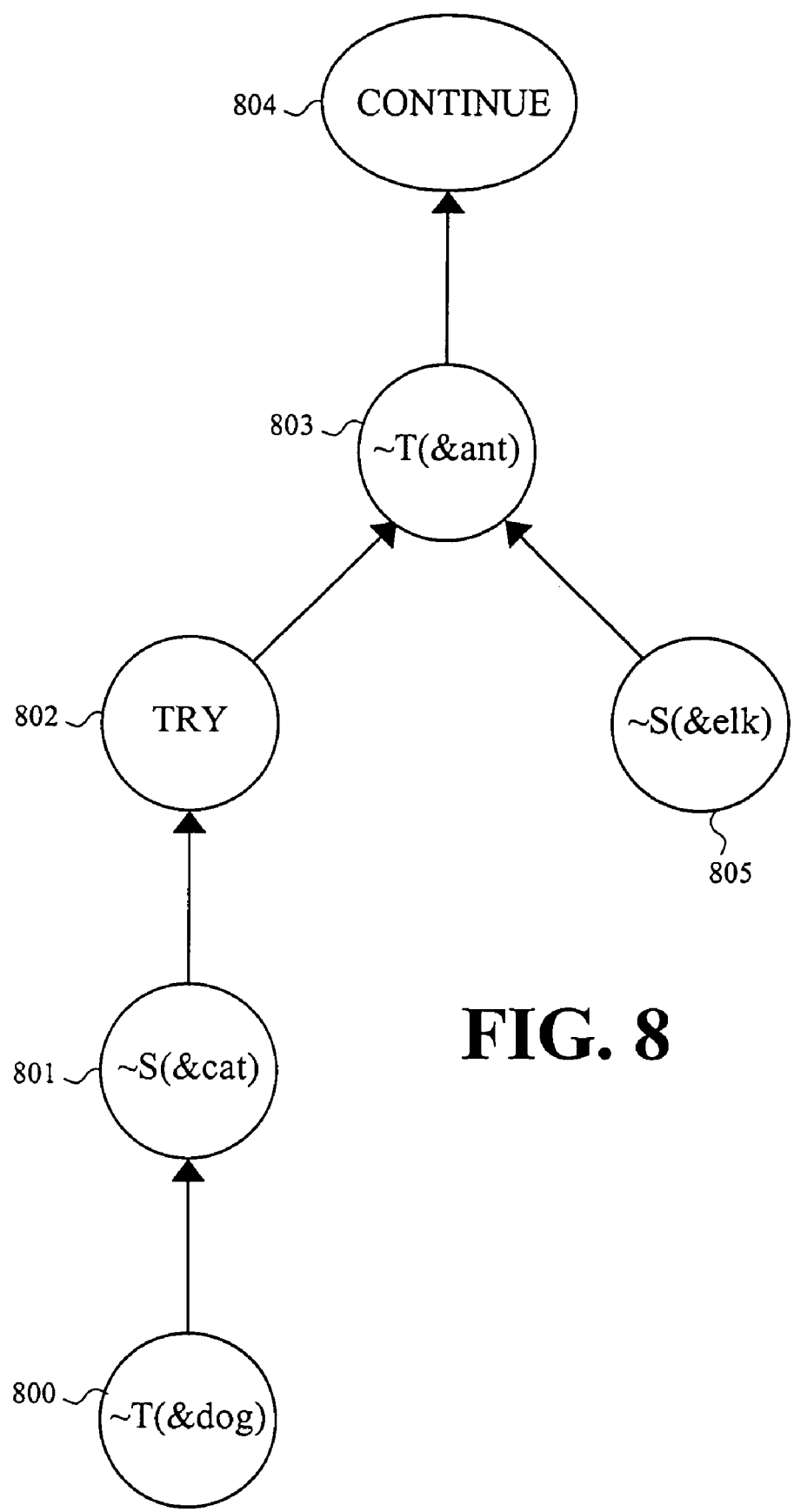
FIG. 8 shows a cleanup tree.

Since many of the EH stack states are duplicated, or subsequences of other EH stack states, the states should be represented as a "cleanup tree". FIG. 8 shows a cleanup tree for the example in FIG. 7. Root node 804 represents the continuation stack. Each node in the tree represents a state of the EH stack. The state is represented by the upward path from said node to the root. For example, node 800 represents the EH stack state associated with vertex 710 of FIG. 7. The top of the stack corresponds to node 800, followed by nodes 801, 802, 803, and 804. Similarly, node 805 to represents the EH stack state associated with vertex 720 of FIG. 7. The path does not have to start at a leaf node. For instance, the path starting at node 801 and finishing at node 804 represents the EH stack state associated with vertices 708 and 712. Sometimes there is a plurality of cleanup trees, called a cleanup forest. This situation occurs when the routine being analyzed has a try block that catches all possible exceptions. In such a case, there is a separate tree for each such try block, and the root of said trees will be "TRY" nodes corresponding to the try blocks, and not the usual CONTINUE node, because there are never any cleanup actions beyond the try block. Note too that there is no cleanup tree node for object "boa" in FIG. 8. The reason is that "boa" is never destroyed along an exceptional path.

Figure 9:
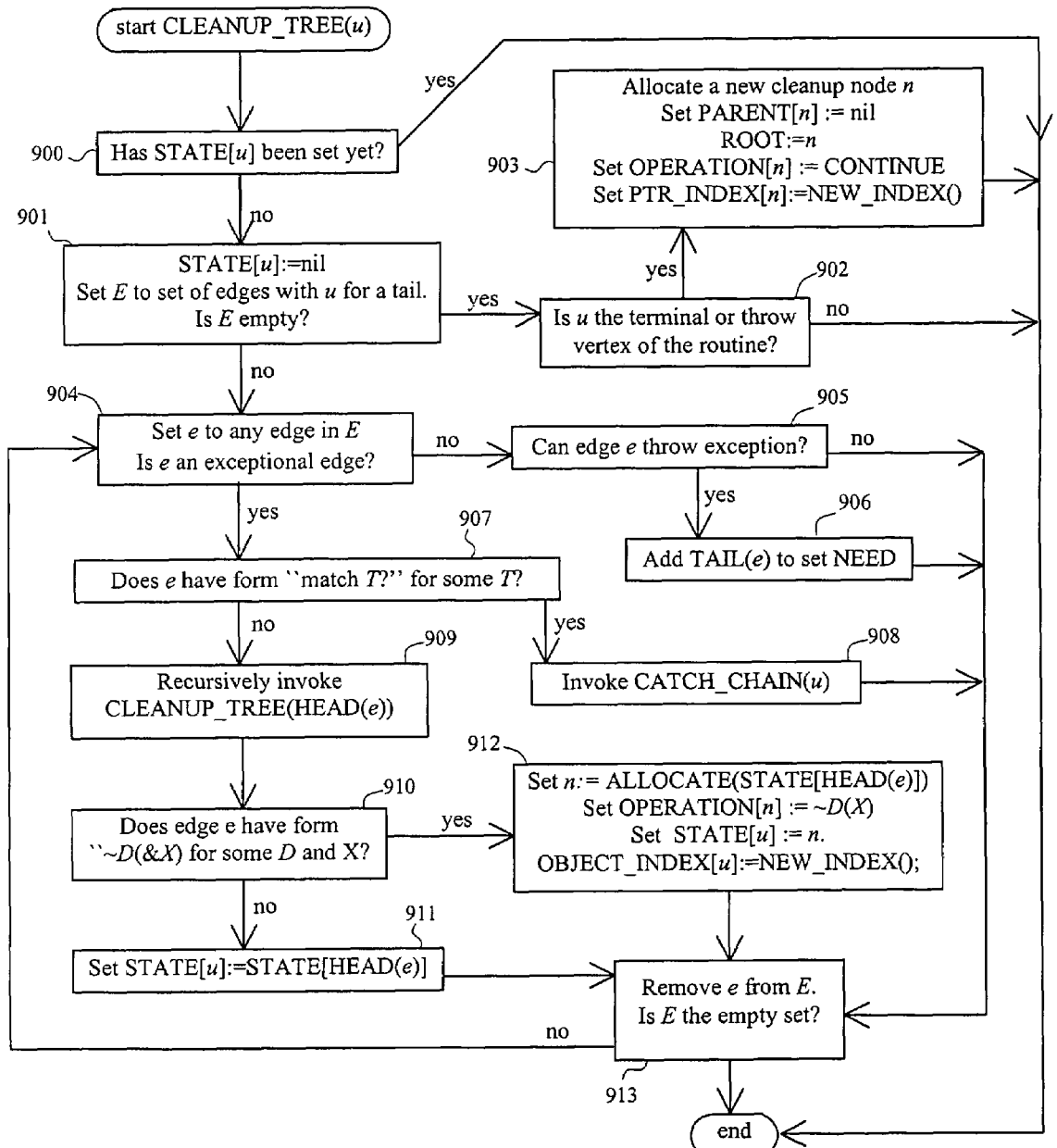
FIG. 9 is a flow chart for process CLEANUP_TREE(u), which builds the portion of a cleanup tree related to vertex u.
Figure 10:
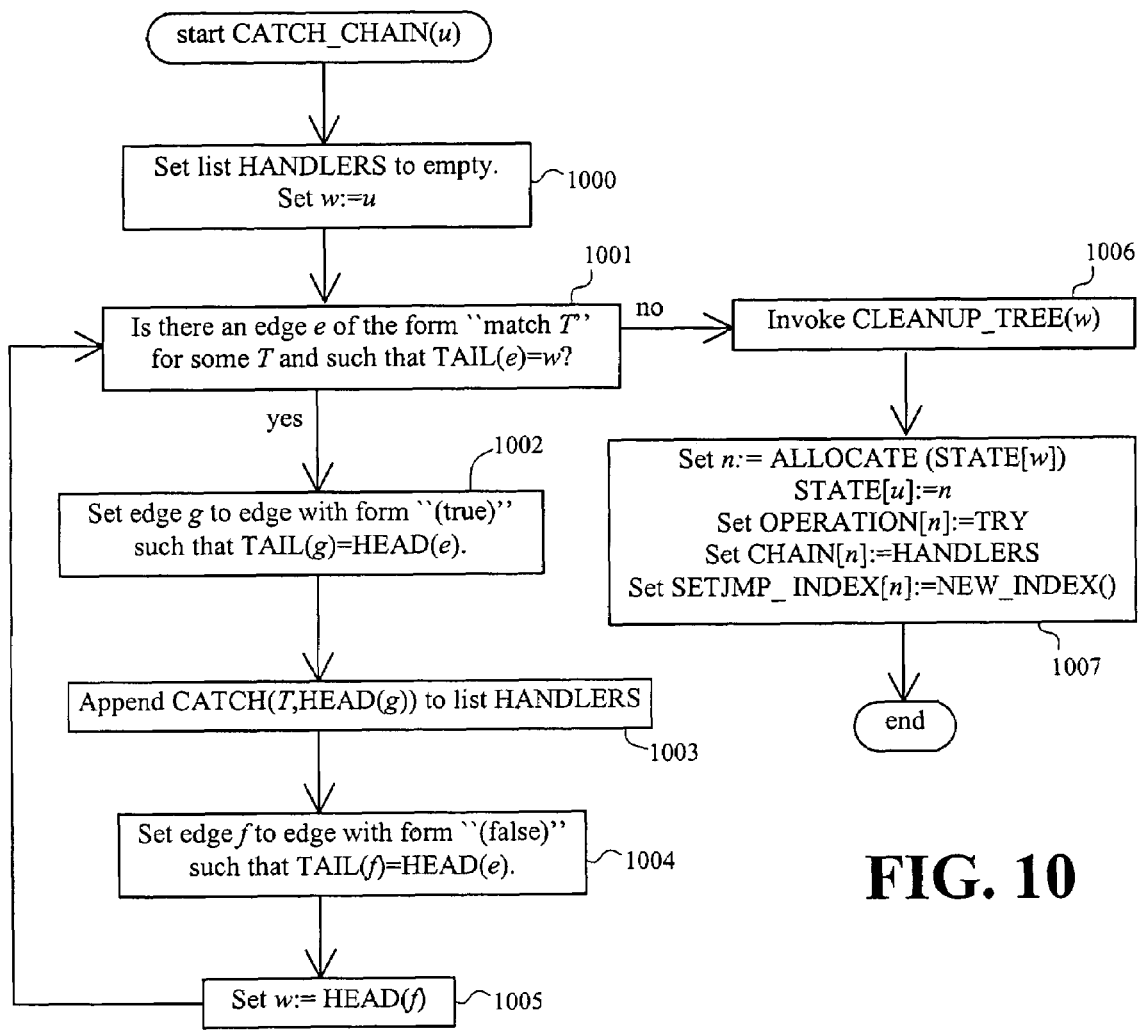
FIG. 10 is a flow chart for process CATCH_CHAIN(u), which is a subprocess of CLEANUP_TREE(u) for computing EH stack state for a try block.

The methods of FIG. 9 and FIG. 10, and FIG. 13 compute some maps and sets. Map STATE is simply a map from vertices to cleanup tree nodes. PARENT is a map from cleanup nodes to cleanup nodes such that PARENT[n] is the parent of node n in the cleanup tree. OPERATION[n] indicates whether tree node n represents the continuation stack, a destruction, or a try block. Maps KIND_INDEX, PTR_INDEX, OBJECT_INDEX, and SETJMP_INDEX are partial maps from cleanup tree nodes to integers. The integers correspond to flow equations of interest. KIND_INDEX is for flow equations related to setting the "tag" and "next" fields of EH_items. PTR_INDEX is for flow equations relating to how EH_stack ptr should be set. OBJECT_INDEX is for flow equations relating to whether a destructor should be called. SETJMP_INDEX is for flow equations relating to whether "setjmp" should be called. No integer occurs twice in any map, and no integer occurs in more than one of the four maps. The maps are partial in the sense that each map does not necessarily associate an integer with every cleanup tree node. There is also a partial map CHAIN from cleanup tree nodes to catch clause information. The methods also fill a set NEED of vertices with those vertices that require a valid EH stack state.

FIG. 9 shows method CLEANUP_TREE (u), which computes the portion of the cleanup tree required at a control-flow graph vertex u, and sets STATE[u] to the cleanup tree node representing an EH stack state. Step 900 checks whether STATE[u] has been set yet, and if so, there is no work to do. Otherwise step 901 sets STATE[u] to a special marker nil, to mark the fact that u is being processed. The marker keeps the method from infinitely recursing on control-flow graphs containing loops. Step 901 also initializes set E to the set of edges with tail vertex u. If set E is empty, then step 902 checks if u is the terminal or throw vertex, and if so, step 903 allocates the root node of the cleanup tree, and sets the maps appropriately. Step 903 allocates a node directly, instead of calling method ALLOCATE, because the root node needs special treatment. If set E is non-empty then step 904 chooses any edge in E for inspection. If it is not an exceptional edge, then step 905 checks whether e can thrown an exception. If so, step 906 adds the tail of e to set NEED. If in step 904 edge e is exceptional, then step 907 checks if e is the entry into a chain of catch clauses for a try block. If so, then step 908 invokes method CATCH_CHAIN vertex for u (which is the tail of e). Otherwise step 909 recursively invokes method CLEANUP_TREE on the head of e. The point of recursion is to traverse the rest of the exceptional edges the contribute to the EH stack state for vertex u. Step 910 checks if edge e destroys an object, and if not, step 911 simply propagates the state of its head back to its tail. If edge e in step 910 does destroy an object, then step 912 creates a cleanup tree node that represents the destruction. Step 913 removes e from E and repeats step 904 if there are more edges remaining.

FIG. 10 shows method CATCH_CHAIN(u) that constructs parts of the cleanup tree corresponding to a try block whose catch-clause matching logic starts at vertex u. Step 1000 sets list HANDLERS to empty. The list accumulates information about catch clauses for the try block. Step 1000 also sets vertex w to u. Steps 1001–1005 march w down the catch clause matching logic. Step 1001 checks if w is the tail of a match instruction. If so, step 1002 sets edge g to the following edge with form "(true)", i.e., the edge to be taken if the match is true. Step 1003 appends the information about the type T matched and the vertex HEAD(g), which is where execution resumes if type T is thrown from the try block. Step 1004 finds the edge $f$ that is taken if the match is false. Step 1005 sets w to the head of $f$, and goes back to step 1001, which determines if w is the beginning of more match logic for the same try block. Once possible matching logic is exhausted, step 1006 is invoked to find any further required cleanup. Finally, step 1007 creates a cleanup tree node for the try block, which includes setting CHAIN[n] and SETJUMP_INDEX[n].

FIG. 11 shows a method for building the entire forest of cleanup trees. Step 1100 sets variable SAVER, which is always nil or a reference to a cleanup tree node. It keeps track of a cleanup node that will be used to store information about the continuation stack. Step 1101 sets variable ROOT, which is always nil or a reference to the cleanup node such that OPERATION[ROOT]=CONTINUE. Step 1102 sets N_INDEX to 0. Variable N_INDEX is the number of integers allocated so far for the partial maps KIND_INDEX, PTR_INDEX, OBJECT_INDEX, and SETJMP_INDEX. Step 1103 calls method CLEANUP_TREE for each vertex u that is the tail of a normal edge. The order in which the vertices are processed is irrelevant for correctness, because procedure CLEANUP_TREE recurses as necessary over the graph. However, to minimize the recursion depth, it is recommended that the vertices be traversed in post-order (bottom-up). Step 1104 checks if the graph has a terminal vertex v. If so step 1105 sets the cleanup state of v to ROOT. This step is important for guaranteeing that EH_stack_ptr will be set correctly when the routine exits.

FIG. 12 shows method NEW_INDEX( ) for allocating a new integer for the partial maps. Step 1200 sets k to the current value of N_INDEX. Step 1201 increments N_IN-DEX, and step 1202 returns the value of k.

FIG. 13 shows method ALLOCATE(m), which allocates a cleanup tree node with parent m on behalf of methods CLEANUP_TREE and CATCH_CHAIN. Step 1300 allocates a new cleanup node. Step 1301 sets the PARENT and KIND_INDEX map entries for the new node. Step 1302 checks whether SAVER is nil. If so, then step 1303 checks if m is nil. If so, or if step 1304 determines that m is the continue node, then step 1305 sets SAVER to reference n.

The check in step 1303 is necessary, because in some cases there is not just one cleanup tree, but a forest of cleanup trees. Step 1306 returns the new cleanup-tree node n.

Figure 14:
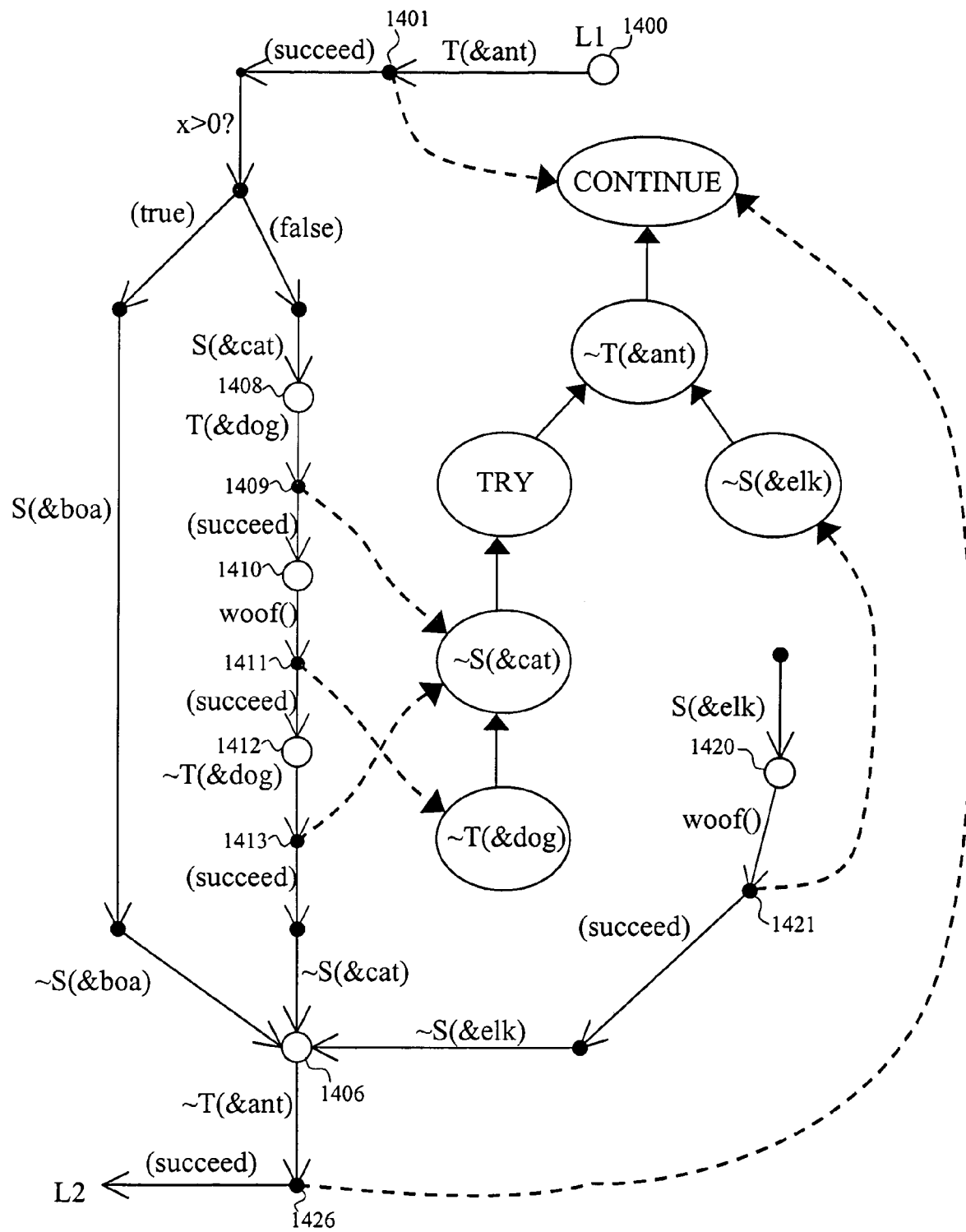
FIG. 14 shows the relationship between a control-flow graph and a cleanup tree.

FIG. 14 shows the map STATE after the method of FIG. 11 is applied to the example in FIG. 1. FIG. 14 depicts the control-flow graph from FIG. 7 and the cleanup tree from FIG. 8. For convenience, the reference numerals for each vertex are exactly 900 more than those for the corresponding vertices in FIG. 5. For each vertex u in NEED, FIG. 14 shows the vertex as an open circle. For each vertex v such that STATE[v] is relevant, the picture shows a dashed line from v to node STATE[v] of the cleanup tree. STATE[v] is relevant if v is the head of an edge e such that the tail of e is in set NEED. This occurs when edge e might throw an exception. The tail of e is in NEED because the present invention will need to put the EH stack in a valid state before the edge is executed, but the cleanup actions are determined by the exceptional edges starting from the head of e. For example, vertex 1400 is in set NEED, and the corresponding cleanup state is for vertex 1401. Similar, vertices 1406, 1408, 1410, 1412, and 1420 are in set NEED, and for each of these, the respective relevant cleanup states are for vertices 1426, 1409, 1411, 1413, and 1421.

Figure 15:
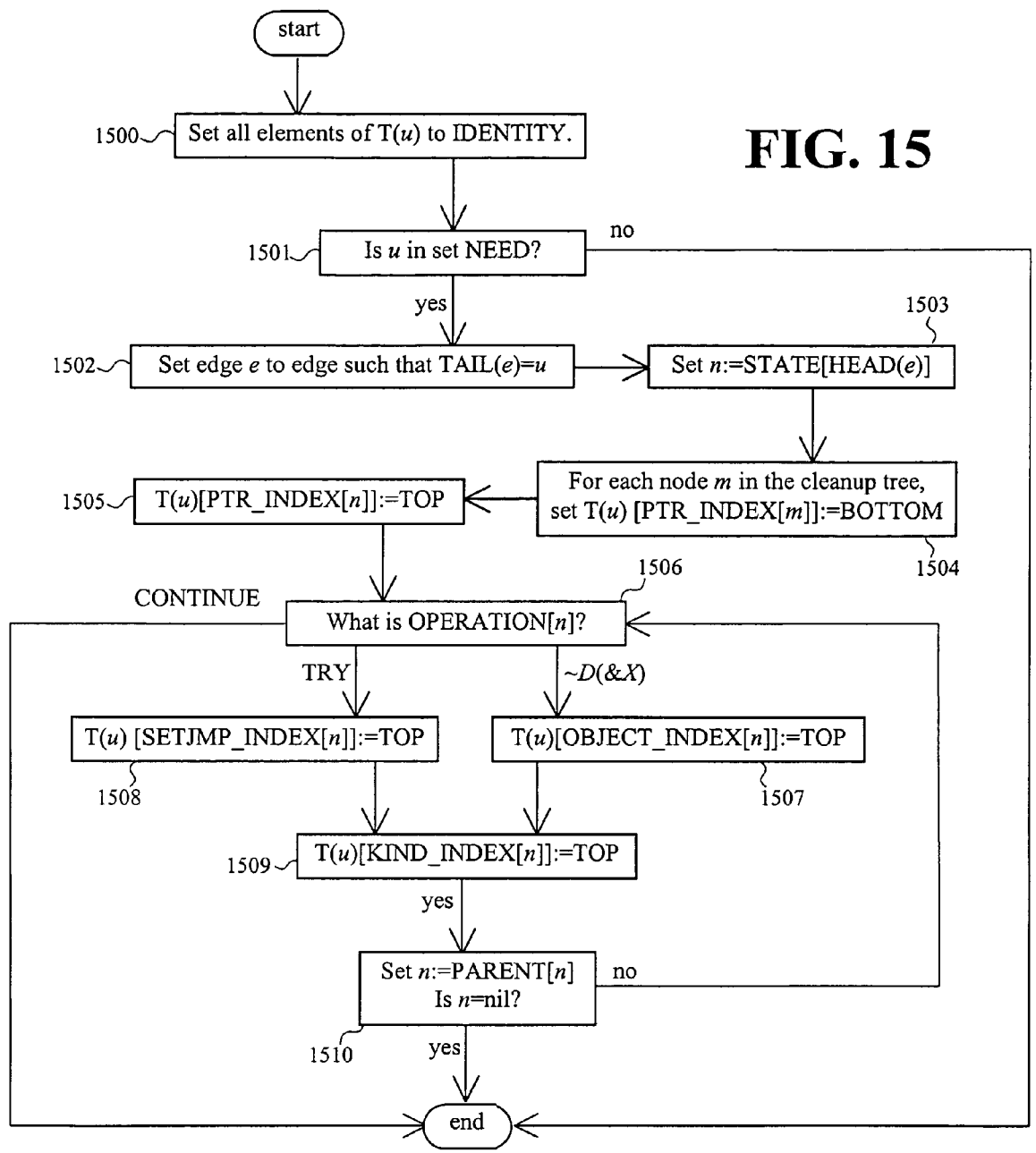
FIG. 15 is a flow chart for a method for computing a vector T(u) of transfer functions related to a vertex u.

FIG. 15 shows a method for computing T(u), which is a map such that T(u)(k) is a function on a two-point Boolean lattice used to generate the kth flow equation for DOWN-SAFE or UPSAFE. The functions are IDENTITY, TOP, and BOTTOM. The functions should be such that for any lattice value x, IDENTITY(x)=x, TOP(x)=true, and BOTTOM(x) =false. Step 1500 initializes T(u) to IDENTITY. Step 1501 checks if u is in set NEED. If so, then step 1502 finds the edge e with tail u. Step 1503 sets n to STATE[HEAD(e)], which corresponds to the cleanup state to which the EH stack must be set before edge e is executed. Step 1504 sets T(u) [PTR_INDEX[m]] to BOTTOM for each node m in the cleanup tree. Step 1505 sets T(u) [PTR_INDEX[n]] to TOP. The net effect of steps 1504 and 1505 is to record the fact that at vertex u, the top-of-stack pointer EH_stack_ptr must correspond to node n. Steps 1506–1510 walk n up to the root of the cleanup tree to find the cleanup actions required if edge e throws an exception. Step 1506 queries the kind of node n. If n represents a destruction, then step 1507 sets T(u)[OBJECTINDEX[n]] to TOP. If n represents a try block, then step 1508 sets T(u)[SETJMP_INDEX[n]] to TOP. If n represents the continuation stack, then there is nothing further to set in T(u). Steps 1507 and 1508 both go to step 1510, which advances n up one node in the cleanup tree, and if there is another node, goes back to step 1506.

Figure 16:
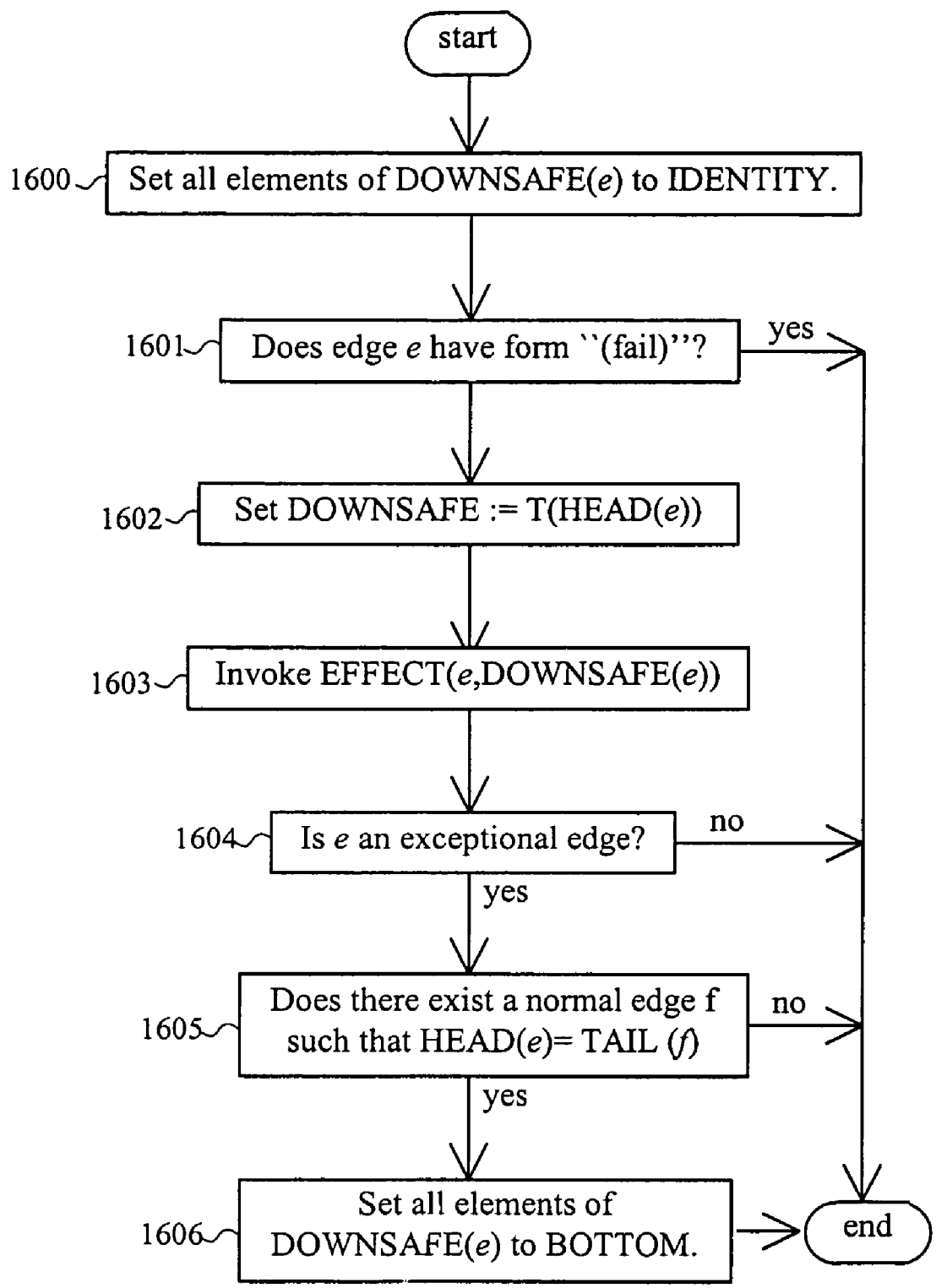
FIG. 16 is a flow chart for computing a vector DOWNSAFE(e) of transfer functions for down-safety related to an edge e, when the transfer functions are Boolean functions.

FIG. 16 shows a method that computes DOWNSAFE, where DOWNSAFE(e)[k] is the down-safety transfer function (IDENTITY, TOP, or BOTTOM) for edge e and flow equation k. Step 1600 initializes all elements of DOWNSA-FE(e) to IDENTITY. Step 1601 checks if edge e is a "(fail)" edge. If so, the rest of the steps are skipped. This is because exception are presumed to be rare events, and thus the corresponding "(fail)" branches are rarely taken. Skipping the other steps causes the solution DOWNSAFE* to tend to yield more optimistic results. Step 1602 sets DOWNSAFE (e) to T(HEAD(e)). Step 1603 invokes method EFFECTS to account for effects of the instruction on e on the solution. Step 1604 checks whether e is an exceptional edge. If so, step 1605 checks whether edge e is followed by a normal edge f. If so step 1606 sets all elements of DOWNSAFE(e) to BOTTOM. The purpose of steps 1604–1606 is to prevent placement of executable code on exceptional edges, because such edges will eventually be removed. The steps guarantee that when the flow equations for DOWNSAFE* are solved, no "true" value will propagate backwards into vertices that will eventually be removed.

The solution DOWNSAFE* is a map from vertices to Boolean values. Computing DOWNSAFE*(u) for each vertex u from DOWNSAFE(e) for each edge is simply a matter of solving the following backwards flow equations:

DOWNSAFE*(v)[k]=(k=PTR_INDEX(r)) if v is the initial, terminal, or throw vertex and r is a cleanup tree node such that OPERATION[r]=CONTINUE. This is the boundary condition for control entering or leaving the control-flow graph.

DOWNSAFE*(TAIL(e))[k]≦DOWNSAFE(e)[k] (DOWNSAFE*(HEAD(e)) where e is any edge in the control-flow graph.

The boundary condition for initial vertex is unusual for backwards flow problems. It is necessary here because placement of EH operations will depend upon uphill changes in the solution, and without this boundary condition, the solution at the initial vertex might be high and no uphill change would ever occur. The precise method of solving the flow equations is not part of the present invention.

Figure 17:
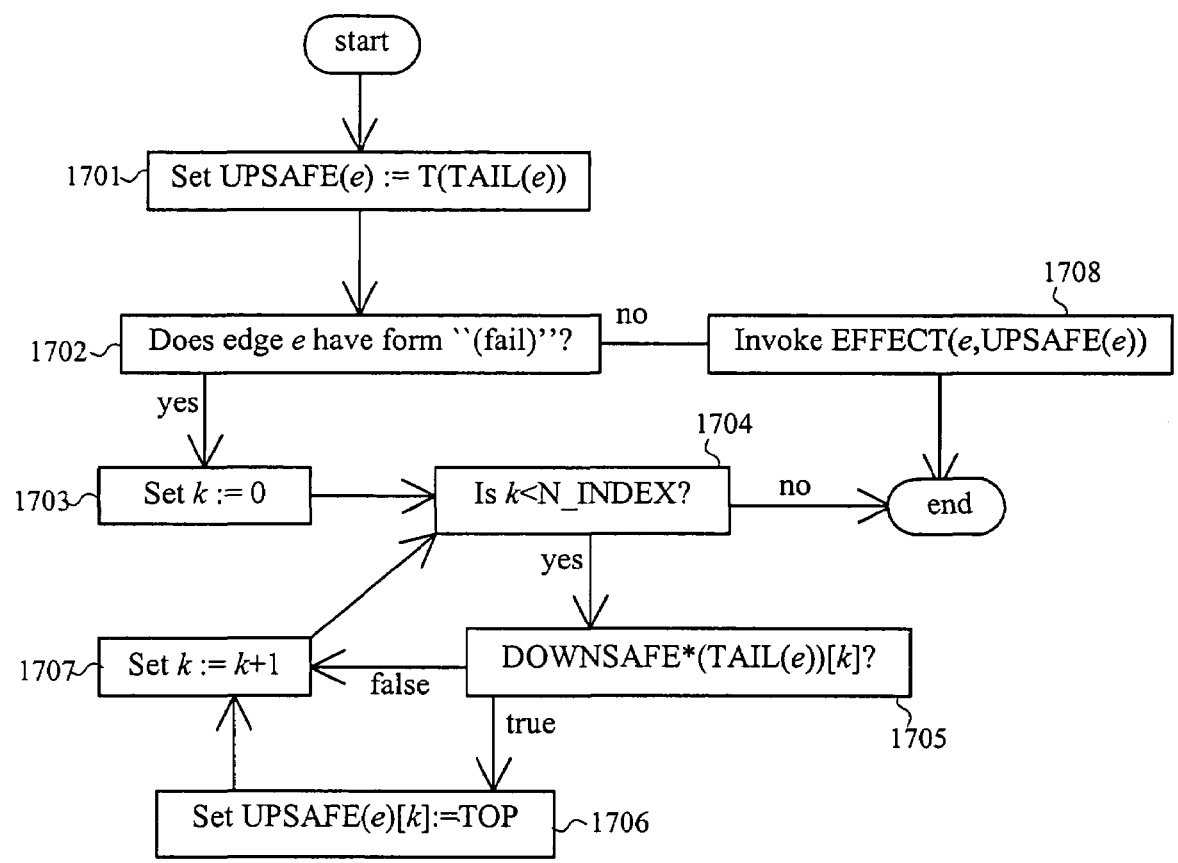
FIG. 17 is a flow chart for computing a vector UPSAFE(e) of transfer functions for up-safety related to an edge e.

FIG. 17 shows a method that computes UPSAFE, where UPSAFE(e)[k] is the up-safety transfer function (IDENTITY, TOP, or BOTTOM) for edge e and flow equation k. Step 1701 initializes UPSAFE(e) to T(TAIL(e)). Step 1702 checks if e is a "(fail)" edge. If so, steps 1703–1707 adjust elements of UPSAFE(e) to take into account the optimism of DOWNSAFE*. Steps 1703, 1704, and 1707 cause k to iterate over all valid subscripts of UPSAFE(e). Step 1705 checks if DOWNSAFE*(TAIL(e))[k] is true. If so, then step 1706 sets UPSAFE(e)[k] to TOP. The reasoning is that the true value in DOWNSAFE says that corresponding portion of the EH stack will be set (possibly on a speculative basis) by the time vertex TAIL(e) is reached, and thus is available to subsequent vertices. If step 1702 determines that e is not a "(fail)" edge, then step 1708 invokes method EFFECT.

Figure 18:
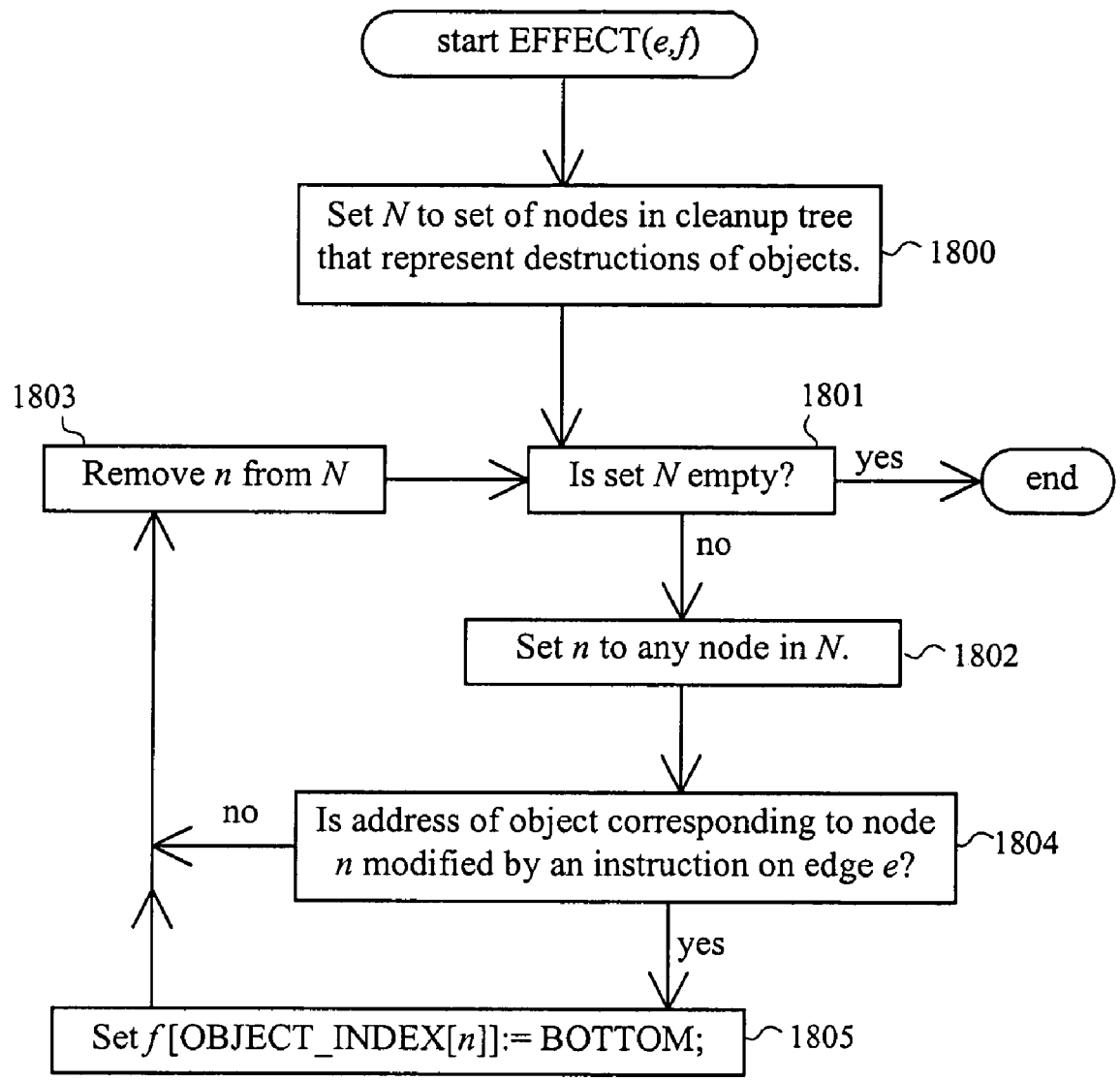
FIG. 18 is a flow chart for process EFFECT(e,f), which adjusts a vector of transfer functions f for the effects of an instruction on edge e.

FIG. 18 shows a method EFFECT for updating an array of transfer functions ƒ to reflect effects of the instruction on edge e. The array ƒ is either DOWNSAFE from FIG. 16 or UPSAFE from FIG. 17, depending upon from which figure method EFFECT was invoked. Steps 1800–1803 loop over all nodes in the cleanup tree that correspond to destructions of objects, i.e., nodes n such that OBJECT_INDEX(n) is defined. Step 1804 checks whether the address of the object corresponding to node n is modified by the instruction on edge e. If so, then step 1805 sets ƒ[OBJECT_INDEX(n)] to BOTTOM. Whether an instruction modifies an object's address may depend upon the representation of the routine and target machine. For example, if addresses of local variables are invariant and visible throughout a routine, then addresses of objects represented by variables are never modified. On the other hand, if an object is dynamically allocated on a heap and referenced via a pointer variable, the address is modified whenever the pointer variable is modified. Another case arises when the representation has scope rules. When entering or exiting a scope that declares object x, the address of x should be treated as being modified at the entry and exit points, so that placement of EH operations never places its address outside its scope. If instructions never modify object's addresses, then the entire method of FIG. 18 can be omitted.

The solution UPSAFE* is a map from vertices to Boolean values. Computing UPSAFE*(u) for each vertex u from UPSAFE(e) for each edge is simply a matter of solving the following forwards flow equations:

UPSAFE*(v)[k]=(k=PTR_INDEX(ROOT)) if v is the initial vertex. This is the boundary condition for control entering the control-flow graph.

UPSAFE*(HEAD(e))[k]≦UPSAFE(e)[k](UPSAFE* (TAIL(e)) where e is any edge in the control-flow graph.

The precise method of solving the flow equations is not part of the present invention.

For both the DOWNSAFE* and UPSAFE* problems, greatest fixed-point solutions are preferred. Furthermore, both problems should be solved on the graph before any exceptional edges are removed.

Figure 19:
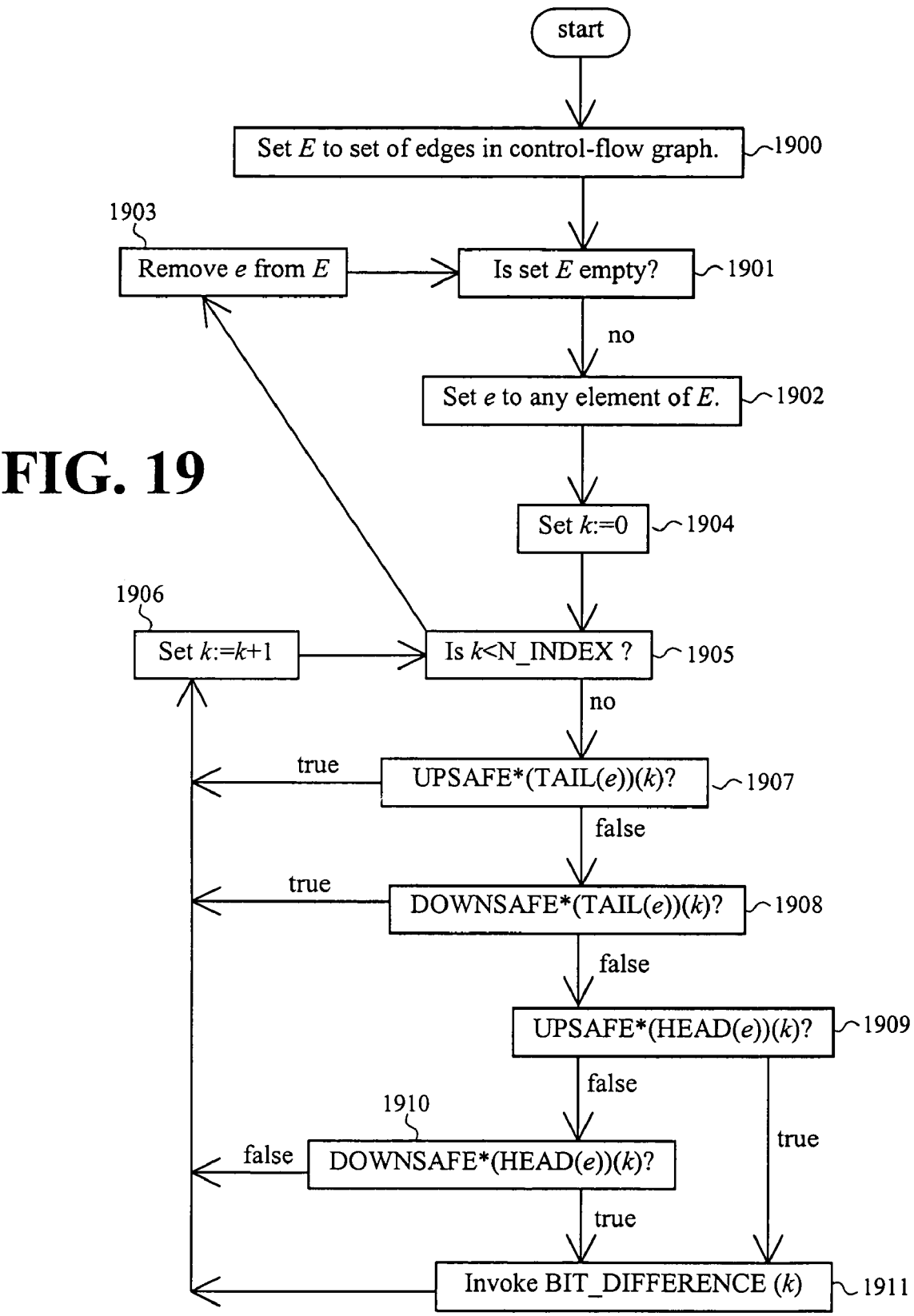
FIG. 19 shows a method for placing instructions related to exception handling in accordance with the present invention.
Figure 20:
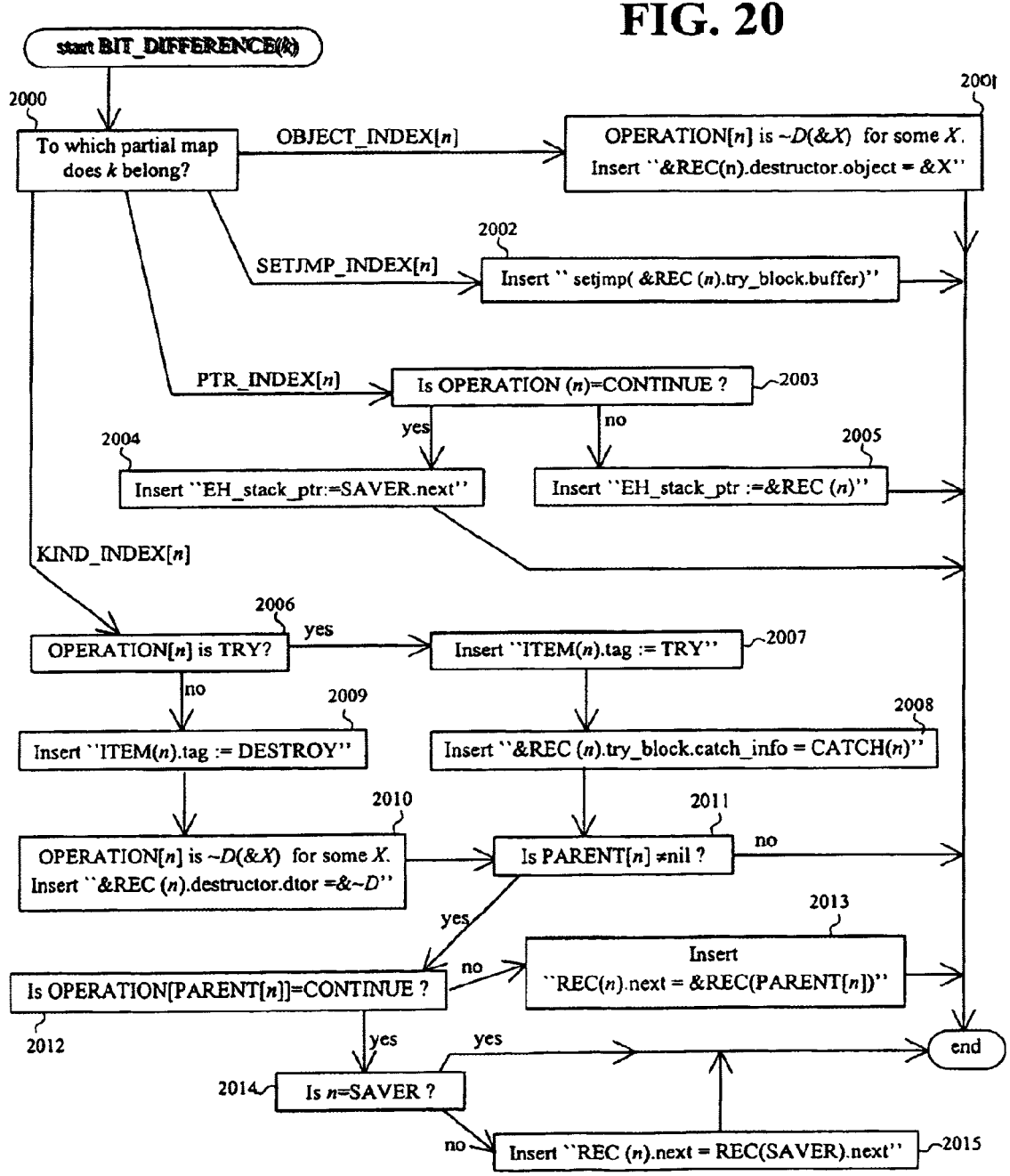
FIG. 20 shows process BIT_DIFFERENCE(k), which places instructions related to flow equation with index k.

FIGS. 19 and 20 show a method for using the solutions UPSAFE* and DOWNSAFE* to place instructions that set components of EH stack. FIG. 19 finds the edges for said insertion, and FIG. 20 determines what instructions to place. Step 1900 initializes set E to the set of edges. Steps 1901–1903 loop over each edge e in E. Steps 1904–1906 loop over each index k of the solutions to the flow equations. Steps 1907–1910 check whether the following conditions both apply to edge e:

UPSAFE* (TAIL(e)) V DOWNSAFE* (TAIL(e)) is false.

UPSAFE* (HEAD(e)) V DOWNSAFE* (HEAD(e)) is true.

If both conditions apply, step 1911 invokes method BIT_DIFFERENCE(k).

FIG. 20 shows method B BIT_DIFFERENCE(k). Throughout FIG. 20, the notation "Insert" means to insert an instruction on the edge e being processed in FIG. 19 when it invoked BIT_DIFFERENCE(k). The notation REC(n) means the EH_item associated with node n. There is a unique EH_tem associated with each node n of the cleanup tree, except for the CONTINUE node, which has no corresponding EH_item because in effect its EH_item is whatever was on top of the any other instructions on the edge. Multiple instructions on an edge are permitted at this point in the transformation process. Step 2000 determines to which partial map (OBJECT_INDEX, SETJMP_INDEX, PTR_INDEX, OR KIND_INDEX) index k belongs. As noted earlier, no integer belongs to more than one of those maps. If k=OBJECT_INDEX(n) for some cleanup tree node n, then the corresponding flow equations deal with placement of a destruction operation. Step 2001 places an instruction that sets the "desctructor.object" field of the associated EH_item. If k=SETJMP_INDEX(n) for some cleanup tree node n, then step 2002 inserts a call to "setjmp". If k=PTR_INDEX(n) for some cleanup tree node n, then step 2003 determines whether n is the CONTINUE node. If so, then step 2004 inserts an assignment that sets EH_stack_ptr to point to SAVER.next, where SAVER is the EH_item in which prologue code will save (in SAVER.next) the EH_stack_ptr from the calling routine. If in step 2003, n is not the CONTINUE node, then step 2005 inserts an assignment that sets EH_stack_ptr to point to the EH_item associated with node n. If in step 2000, k=KIND_INDEX(n) for some cleanup tree node n, then step 2006 inspects the operation represented by n. If it is for a try-block, then step 2007 inserts an assignment to set the field "tag" of the associated EH_item to "TRY", and step 2008 inserts an assignment to se the field "try_block.catch_info". Otherwise, if in step 2005 the operation is not for a try-block, it must be for a destruction. Step 2009 sets the field "tag" of the associated EH_item to "DESTROY", and step 2010 inserts and assignment that sets the filed "destructor.dtor" to point to the destructor for the object to be destroyed. Steps

2011–2015 concern setting the field "next" of the associated EH_item. Step 2011 checks whether node n has a parent. If so, step 2012 checks wither this parent is the CONTINUE node. If not, step 2013 inserts an assignment that sets the filed "next" of the associated EH_item to point to the EH_item associated with the parent. If the parent in step 2012 is the CONTINUE node, then step 2014 checks whether n is the SAVER node. If so, the prologue will handle setting the "next" field. Otherwise, step 2014 inserts an assignment that sets the "next" field from the "next" field of the SAVER node.

Figure 21:
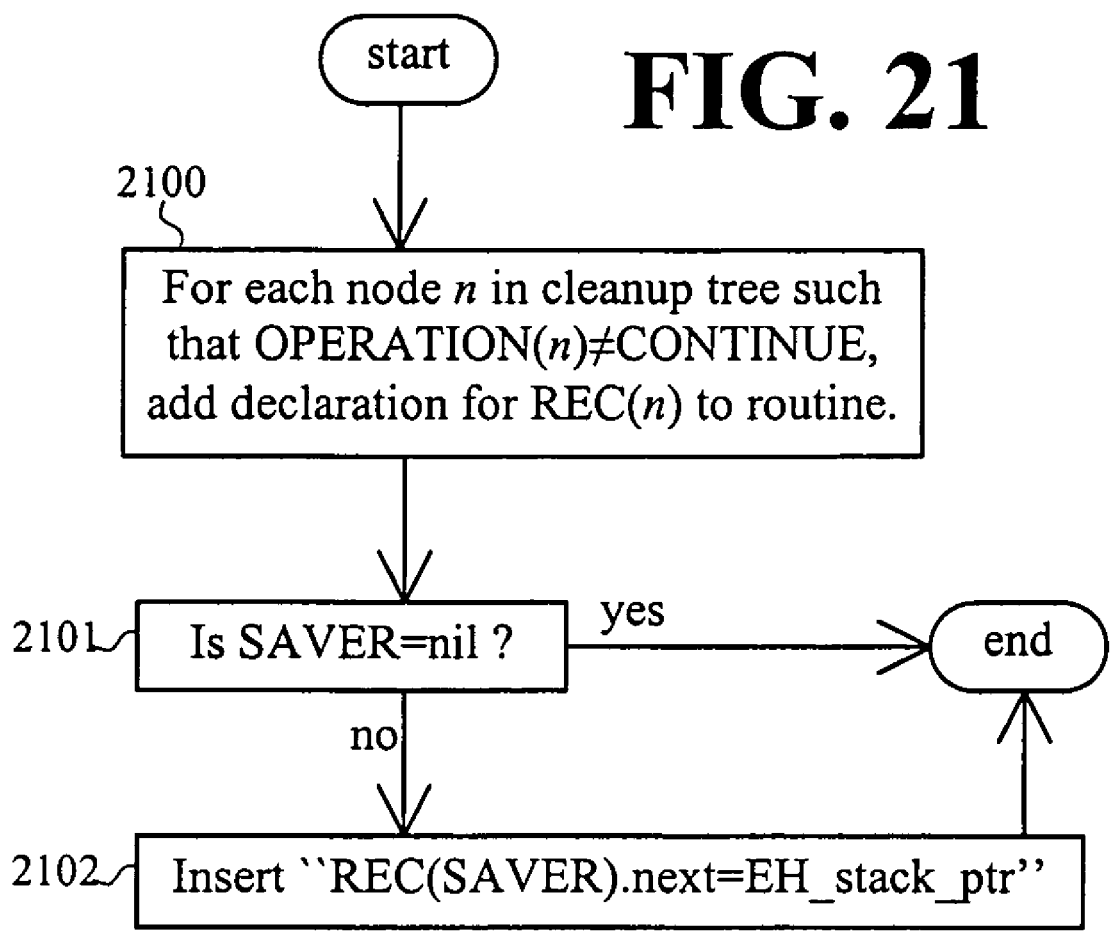
FIG. 21 shows a method for inserting a prologue in accordance with the present invention.

FIG. 21 shows a method for inserting the prologue. Step 2100 declares the EH_items required for the routine. The exact nature of the declarations depends upon the intermediate representation of the program. Indeed, some representations may not require any such declaration. Step 2101 checks whether SAVER is nil. If not, then step 2102 inserts an assignment, at entry into the routine, that saves the value of EH_stack_ptr in the "next" field of the EH_item associated with node SAVER.

There is no corresponding need to insert an epilogue to restore EH_stack_ptr when the routine exits, because step 1105 of FIG. 11 forces a boundary condition that causes the method of FIGS. 19–20 to restore the EH_stack ptr when necessary.

Figure 22:
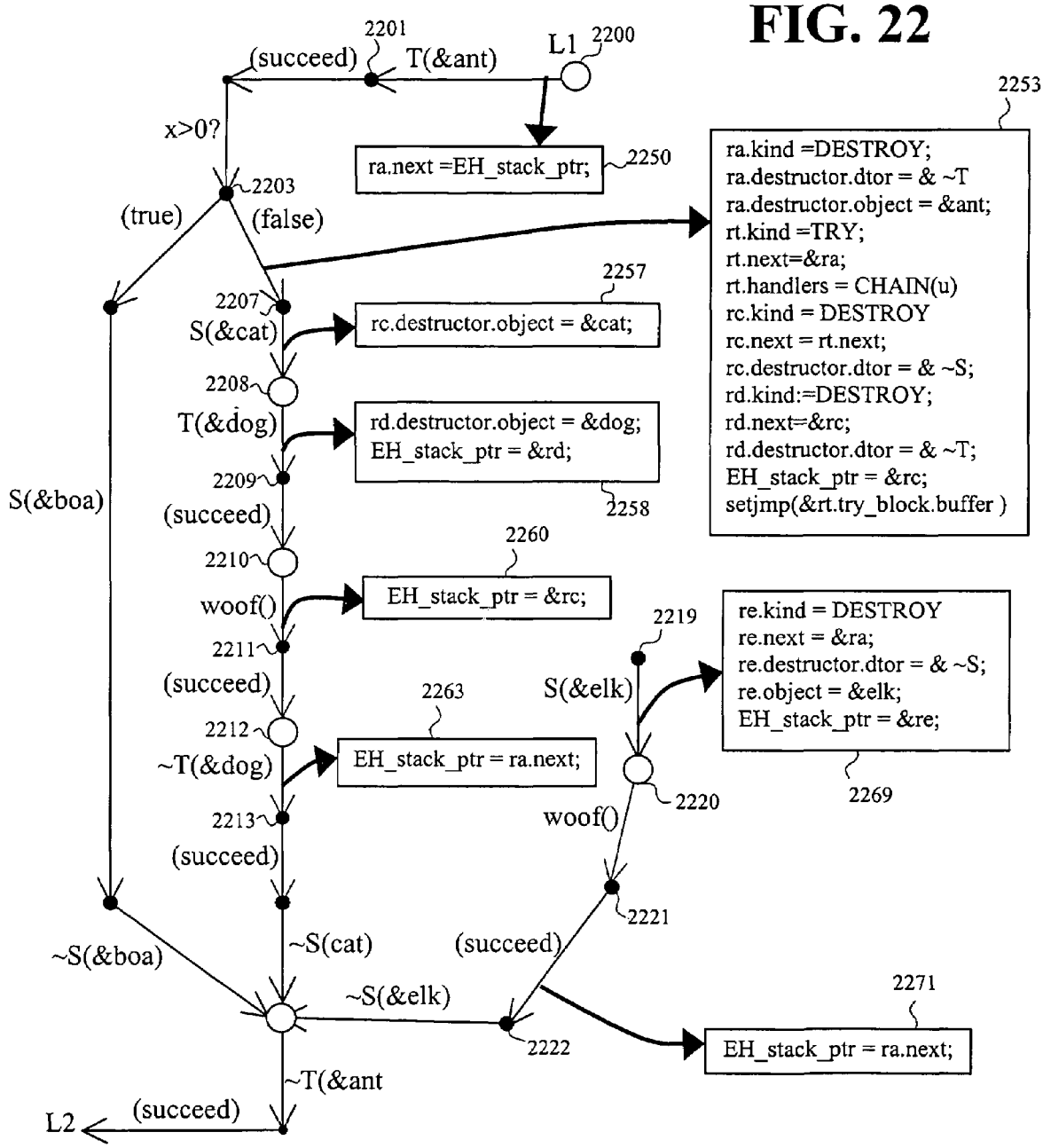
FIG. 22 shows exception-handling instructions inserted into a control-flow graph by a method in accordance with the present invention.

When inserting more than one instruction on an edge and one or more of the instructions is a setjmp, the setjmp should be inserted last. For each setjmp inserted, a conditional if should be inserted that invokes the appropriate handler if the return value from setjmp indicates that it corresponds to a try block catching an exception. The present invention relates only to where the calls to setjmp should be placed, not on what actions to take when a setjmp returns. Besides, said actions depend entirely upon the representation of the handlers for the try block FIG. 22 shows the EH operations that are inserted for the graph of FIG. 5, assuming that the graph represents an entire routine. For sake of demonstration, the constructors of the various objects are considered to modify the addresses of the objects, in the sense of modification relevant to FIG. 18. Thus assignments to ".destructor.object" are never hoisted above the corresponding call to a constructor. The prologue 2250 is inserted on edge 2200–2201, before any other instructions, since that is the entry into the routine. The assignment 2263 on edge 2212–2213 and assignment 2271 on edge 2221–2222 take care of restoring the EH_stack_ptr. The sequence 2253 of assignments and calls to setjmp, and the assignment 2257 prepare the EH stack for the call on edge 2208–2209 that constructs "dog". Notice that it sets EH_stack_ptr to point to the EH_item "rc", which describes the cleanup actions for "cat", which has not yet been constructed. This is legal, because the constructor for "cat" cannot throw an exception, and thus a valid EH stack is not required while the constructor for "cat" executes. The sequence 2258 of assignments prepare the EH stack for the call to woof( ) on edge 2210–2211. Notice that the assignments were hoisted up before vertex 2209, which is a (succeed)/(fail) branch point. This occurred because step 1601 (in FIG. 16) caused said DOWNSAFE to be speculatively optimistic. The assignment 2260 on edge 2210–2211 after the call to woof( ), and the assignment 2263 on edge 2221–2222 effectively pop items from the EH stack. Said speculations has caused them to be hoisted above (succeed)/(fail) branch points. The sequence of assignments 2269 prepares the EH stack for the call to woof( ) on edge 2220–2221.

FIG. 23 shows the final routine resulting from FIG. 5. Line 2301 shows the declarations of each EH_item added by step 2100 of FIG. 21. In FIG. 23, they have been given the same names as those in FIG. 3 to aid comparison. Line 2303 is the part of the prologue inserted by step 2102 of FIG. 21. Except for this line, no other statements are inserted along the execution path that occurs when x>0, which is a great improvement over the results of prior art shown in FIG. 3. Said line could be optimally placed by a separate partial redundancy elimination computation.

The present invention's partial-redundancy elimination is a departure from standard practice of a partial redundancy elimination, because in effect it uses different control-flow graphs for computing down-safety and up-safety. Step 1601 (in FIG. 16) makes the computation of down-safety behave as if the tail of each (presumed) rarely taken edge is disconnected from the vertex that is connected to in the control-flow graph. Thus the results are based on the speculation that exceptions are never thrown, and tend to cause the placement phase of the present invention to place instructions earlier (which tends to be optimistic) than they would otherwise. Steps 1705–1706 (in FIG. 17) transfer the optimism to the up-safety calculation.

FIG. 24 shows an example for which the present invention's improvement to partial-redundancy elimination results in better optimization. The constructor for R declared on line 2402 can throw an exception. The destructor ~R declared on lines 2403 has a "throwo" clause, which says that it never throws an exception. The do-while loop between line 2408 and 2412 constructs object "fox" on line 2409, and then calls function "woof" (which is the same "woof" from FIG. 1). Object "fox" is implicitly destroyed when the closing brace on line 2412 is reached. Either the construction of "fox" or the call to "woof" can throw an exception. If the construction of "fox" throws an exception, "fox" is considered not yet constructed, but any other objects constructed in surrounding scopes must be destroyed until the exception is caught.

FIG. 25 shows a control-flow graph corresponding to FIG. 24, along with where a method in accordance with the present invention would place the operations for the EH stack. The graph is entered at vertex 2500. Edge 2501–2502 constructs object "fox", and if the construction succeeds, edge 2503–2504 calls function "woof". Since either said edge may throw an exception, the method of FIG. 9 puts the tail vertices of said edges in set NEED. Said vertices are depicted by hollow circles. The assignment sequence 2550 is inserted on edge 2550, since the solutions of DOWN-SAFE* that determine these assignments will be "true" for vertex 2501 (because the construction of "fox" requires them), but false for vertex 2500 (because it is the initial vertex, said boundary conditions apply.) The assignment sequence 2551 is inserted on edge 2501–2502. The assignment to "rf.destructor.object" is here because as in the earlier example, it is assumed that construction of an object modifies is address. Under a more liberal assumption that construction does not modify an object's address, the assignment to "rf.destructor.object" would be moved out of the loop into sequence 2550. Then within the loop, the operations inserted for maintaining the EH stack would be only assignments to EH_stack_ptr on edges 2501–2502 and 2503–2504. The ellipses in the assignment 2553 denote the EH stack_ptr value before entry into the loop. Without the present invention's improvements to partial redundancy elimination, the sequence of assignments 2550 would be moved to inside the loop, on edge 2501–2502 instead, and be executed for each loop iteration instead of once before the loop is entered.

The improvement to partial redundancy elimination is not limited to optimization of exception handling. It works in general wherever some branches are known to be very infrequent. In such cases, the question of step 1604 of FIG. 16 should be changed to "Is e a rarely taken edge?" Of course, a "true" in the resulting solution to DOWNSAFE* will mean "highly likely to be required in the future" rather than the traditional "safe to anticipate". If the operation is not necessarily safe to execute speculatively, e.g. division where the denominator might be zero, then two DOWN-SAFE flow equations should be created for the operation. The first equation should be in accordance with the present invention, and relate to speculative down-safety. The second should be the traditional (strict) down-safety. Then when placing the operation, it should be guarded by conditional code that checks for safety (when the routine executes) if the solution to the speculative DOWNSAFE* is true and the solution to the strict DOWNSAFE* is false.

An alternative to having two equations is to use a single equation, and replace the two-point Boolean lattice with the three-point lattice shown in FIG. 26. A three-point lattice (instead of a four-point lattice) suffices because "strictly down-safe" implies "speculatively down-safe". The lattice points are ordered such that false<likely and likely<true. The top of the lattice is "true", and means that the operation is strictly down-safe. The middle of the lattice is "likely, and means that the operation is speculatively down-safe. The bottom of the lattice is "false", and means that the operation is not speculatively down-safe. To avoid confusion with the earlier discussion, a dollar sign is used here to distinguish the variants based on the three-point lattice; e.g. $DOWN-SAFE and $UPSAFE.

FIG. 27 shows a method for computing down-safety of an edge e based on the notion of a three-point lattice. Step 2700 initializes all elements of $DOWNSAFE to the identity function. Step 2701 checks whether e is rarely taken. It is up to the implementer to decide what edges are rarely taken. E.g., execution frequency data from previous runs of the program might be used. Step 2702 computes the traditional strict down-safety. Step 2703 checks whether the tail of e is the tail of some other edge that is rarely taken. I.e., step 2703 is checking whether the tail of e is a branch point where some of the branches are rarely taken. If so, step 2704 constructs a function P that is similar to the identity function, but maps "true" onto "likely". I.e., it maps strict down-safety onto speculative down-safety. Step 2705 uses P to transform $DOWNSAFE(e) from strict down-safety to speculative down-safety.

Figure 28:
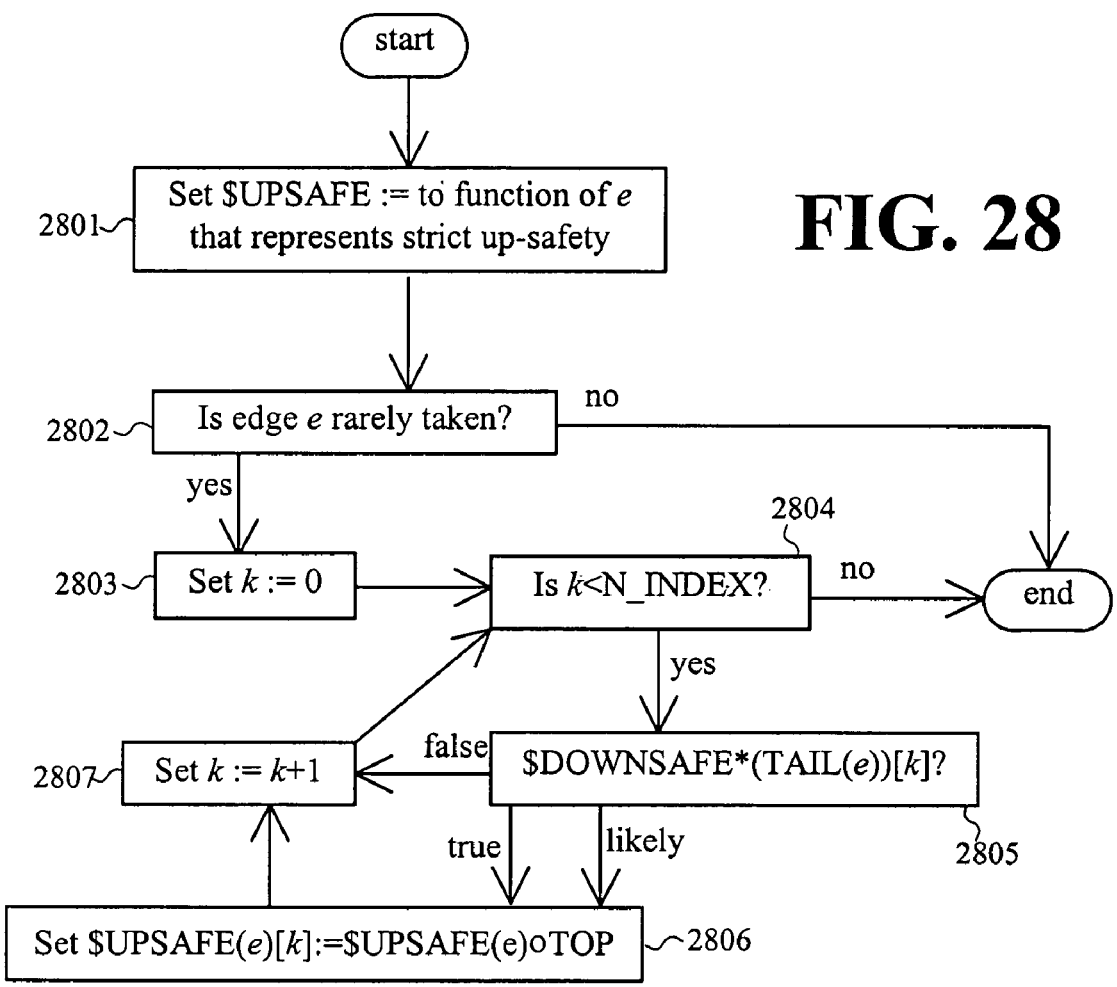
FIG. 28 shows a method for computing vector $UPSAFE(e).

FIG. 28 shows corresponding modifications to the computation of up-safety. Step 2801 initializes $UPSAFE to strict down-safety. Step 2802 checks whether edge e is rarely taken. The definition of "rarely taken" must match that of step 2701 in FIG. 27. Steps 2803, 2804, and 2807 simply loop over each possible flow equation index k. Step 2805 checks whether $DOWNSAFE*(TAIL(e))[k] is "true" or "likely". If so, then step 2806 sets $UPSAFE(e)[k] to itself composed with function TOP. The rationale is that placement of the operations corresponding to k will be done because they are speculatively or strictly down-safe, and thus will have been placed to execute before edge e is executed when the program runs.

The solutions $DOWNSAFE* and $UPSAFE* are computed using the same equations and boundary conditions as for DOWNSAFE and UPSAFE. The only difference is that the lattice for the equations has three points instead of two.

Figure 29:
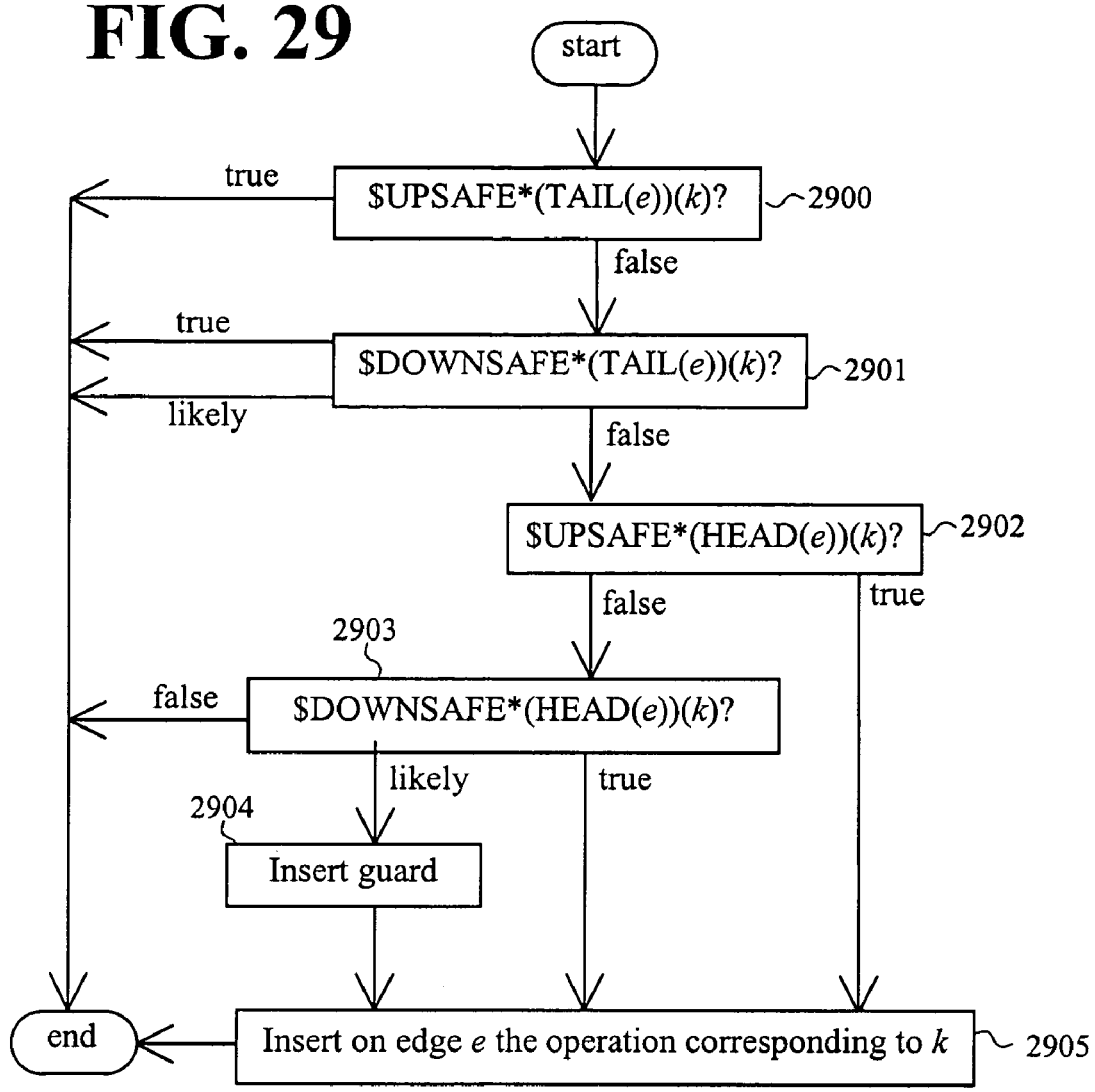
FIG. 29 shows a method for placing instructions based the solutions $DOWNSAFE* and $UPSAFE*.
Figure 30:
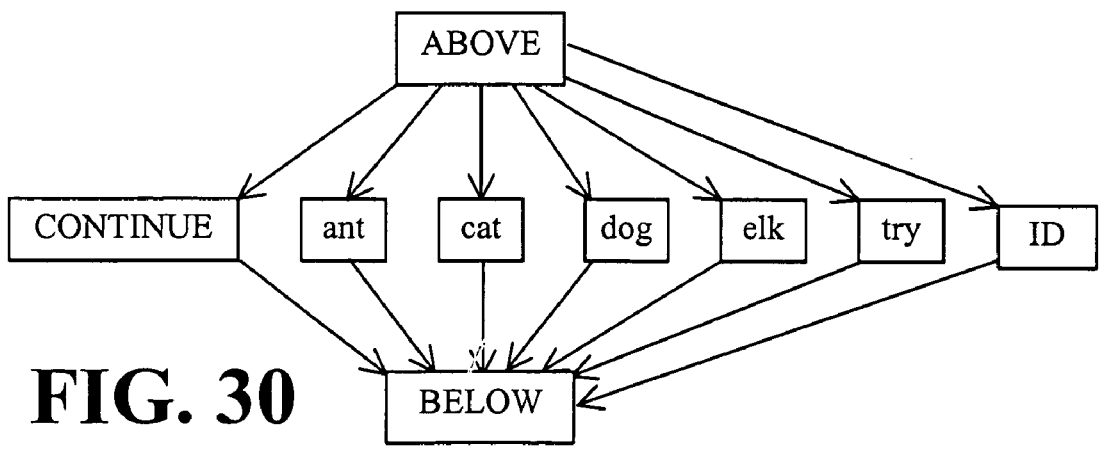
FIG. 30 shows a lattice that concisely represents transfer functions for setting the EH_stack_ptr.

Placement of EH operations using the three-point lattice proceeds as in traditional partial redundancy elimination, with "likely" treated as "true". The only difference is that a value of "likely" indicates that the operation must be guarded. FIG. 29 shows the placement logic for an operation on edge e with flow equations indexed by k. Steps 2900 and 2901 if the solutions $UPSAFE* and $DOWNSAFE* are both false. If so, step 2902 checks if $UPSAFE* is true. If so, then the op The processes shown so far use separate flow equations for each possible value of EH_stack ptr. Doing so simplifies implementation, perhaps at the expense of memory. An alternative scheme is to use the "constant-propagation lattice" well known to implementers of optimizing compilers. FIG. 30 shows the lattice for the problem in FIG. 5. There should be one lattice point for each cleanup tree node. There are three additional points, called "BELOW", "ABOVE", and "IDENTITY". BELOW and ABOVE represents the bottom and top of the lattice respectively. ID represents the identity function. The other points represent values of the EH_stack_ptr, or if used as transfer functions, setting the EH_stack_ptr to point to the corresponding EH_item. Let N be the set of cleanup tree nodes n for which PTR_INDEX[n] is defined. Then a subvector of transfer functions related to setting EH_stack_ptr can be represented as a single value of the lattice, as follows:

Any lattice point that corresponds to a cleanup tree node n denotes that each transfer function is BOTTOM, except that the function for the equation indexed by PTR_INDEX[n] is TOP.

ABOVE denotes that each transfer function is TOP.

BELOW denotes that each transfer function is BOTTOM.

ID denotes that each transfer function is IDENTITY.

A subvector of solutions can be represented similarly to above, with TOP being replaced by "true", BOTTOM replaced by "false", and ID is not used. The appendix containing the presently preferred computer program source code uses this representation.

It is to be understood that a wide range of changes and modifications to the embodiments described above will be apparent to those skilled in the art, and are contemplated. It is therefore intended that the foregoing detailed description be regarded as illustrative, rather than limiting, and that it be understood that it is the following claims, including all equivalents, that are intended to define the spirit and scope of the invention.

I claim:

1. For a computer-executable program that operates on a data structure, where the data structure must have a required state at selected program points, a computer-implemented method of transforming said program comprising:

analyzing the program to determine the state of said data structure at said selected program points, wherein the data structure stores items on a first-in-last-out basis;

partitioning said determined state at each said program point into components that may each be set separately;

determining operations to be inserted into the program in order to set each component of the state at each selected program point based on flow equations for an up-safety and a down-safety of setting the state at each selected program point, wherein the operations assure that the data structure will be in the required state at the selected program points; and placing said operations to eliminate partial redundancies of said operations.

2. The computer-implemented method of claim 1, wherein the states of the data structure are represented as paths on a tree of nodes where:
   each path traverses the tree towards the root; and
   each node on the path represent a component of the state.

3. The computer-implemented method of claim 1, wherein the data structure represents actions to be taken by the program if an exception occurs.

4. The computer-implemented method of claim 3, wherein the selected program points are the points of execution immediately before instructions that might cause an exception.

5. The computer-implemented method of claim 3, further comprising representing the actions to be taken as exception paths in a graph.

6. For a computer-executable program that operates on a data structure, where the data structure must have a required state at selected program points, a computer-implemented method of transforming said program comprising:
   analyzing the program to determine the state of an instance of said data structure at said selected program points, wherein the data structure stores items on a first-in-last-out basis;
   partitioning said instance of said data structure into components;
   determining a set of one or more operations to be inserted into the program in order to set each component of the state at each selected program point based on flow equations for an up-safety and a down-safety of setting the state at each selected program point, wherein the operations assure that the data structure will be in the required state at the selected program points;
   computing placement of the set of operations to eliminate partial redundancies; and
   inserting the set of operations at said program points according to the computed placement.

7. The computer-implemented method of claim 6 wherein the data structure is an exception handling stack.

8. The computer-implemented method of claim 7 wherein the components are a pointer to the exception handling stack and an exception handling data structure.

9. A machine-readable medium having a set of instructions, which when executed by a set of one or more processors, causes said set of processors to perform operations comprising:
   analyzing a program that operates on a data structure, which must have a required state at selected program points in the program, to determine the state of an instance of said data structure at said selected program points, wherein the data structure stores items on a first-in-last-out basis;
   partitioning said instance of said data structure into components;
   determining a set of one or more operations to be inserted into the program in order to set each component of the state at each selected program point based on flow equations for an up-safety and a down-safety of setting the state at each selected program point, wherein the operations assure that the data structure will be in the required state at the selected program points;
   computing placement of the set of operations to eliminate partial redundancies; and
   inserting the set of operations at said program points according to the computed placement.

10. The machine-readable medium of claim 9, wherein the states of the data structure are represented as paths on a tree of nodes where:
   each path traverses the tree towards the root; and
   each node on the path represent a component of the state.

11. The machine-readable medium of claim 9, wherein the data structure represents actions to be taken by the program if an exception occurs.

12. The machine-readable medium of claim 7, wherein the selected program points are the points of execution immediately before instructions that might cause an exception.

* * * * *